United States Patent
Mobarak et al.

(10) Patent No.: US 12,019,163 B2
(45) Date of Patent: Jun. 25, 2024

(54) SYSTEM AND METHOD FOR GNSS CORRECTION TRANSMISSION

(71) Applicant: Swift Navigation, Inc., San Francisco, CA (US)

(72) Inventors: Jason Mobarak, San Francisco, CA (US); Jane Perera, San Francisco, CA (US)

(73) Assignee: Swift Navigation, Inc., San Francisco, CA (US)

( * ) Notice: Subject to any disclaimer, the term of this patent is extended or adjusted under 35 U.S.C. 154(b) by 0 days.

(21) Appl. No.: 18/244,567

(22) Filed: Sep. 11, 2023

(65) Prior Publication Data

US 2024/0085566 A1 Mar. 14, 2024

Related U.S. Application Data

(60) Provisional application No. 63/411,337, filed on Sep. 29, 2022, provisional application No. 63/405,616, filed on Sep. 12, 2022.

(51) Int. Cl.
*G01S 19/07* (2010.01)
*G01S 19/21* (2010.01)

(52) U.S. Cl.
CPC ............ *G01S 19/07* (2013.01); *G01S 19/215* (2013.01)

(58) Field of Classification Search
CPC . G01S 19/215; G01S 19/07–074; G01S 19/41
See application file for complete search history.

(56) References Cited

U.S. PATENT DOCUMENTS

| | | |
|---|---|---|
| 5,451,964 A | 9/1995 | Babu |
| 5,490,076 A | 2/1996 | Rawicz et al. |
| 5,610,614 A | 3/1997 | Talbot et al. |
| 5,825,326 A | 10/1998 | Semler et al. |
| 5,867,411 A | 2/1999 | Kumar |
| 5,935,196 A | 8/1999 | Brodie et al. |
| 5,991,691 A | 11/1999 | Johnson |
| 6,009,376 A | 12/1999 | Brodie et al. |
| 6,127,968 A | 10/2000 | Lu |

(Continued)

FOREIGN PATENT DOCUMENTS

| | | |
|---|---|---|
| CA | 2718988 C | 1/2014 |
| CA | 3079279 A1 | 10/2020 |

(Continued)

OTHER PUBLICATIONS

Schmid, Ralf, et al., "How to Use IGS Antenna Phase Center Corrections", GPS World Tech Talk, Feb. 3, 2010.

(Continued)

*Primary Examiner* — Cassi J Galt
(74) *Attorney, Agent, or Firm* — Jeffrey Schox; Randy Mehlenbacher

(57) ABSTRACT

A method can include and/or a system can be configured for determining satellite positioning corrections, generating a satellite positioning corrections message to transmit the satellite positioning corrections to an endpoint. The method can optionally include and/or the system can optionally be configured for establishing or determining a chain-of-trust, validating the satellite positioning corrections (e.g., at the endpoint), and/or determining a positioning solution.

17 Claims, 9 Drawing Sheets

(56) References Cited

U.S. PATENT DOCUMENTS

| | | |
|---|---|---|
| 6,205,400 B1 | 3/2001 | Lin |
| 6,317,688 B1 | 11/2001 | Bruckner et al. |
| 6,408,245 B1 | 6/2002 | An et al. |
| 6,424,914 B1 | 7/2002 | Lin |
| 6,427,122 B1 | 7/2002 | Lin |
| 6,453,237 B1 | 9/2002 | Fuchs et al. |
| 6,552,680 B1 | 4/2003 | Barber et al. |
| 6,628,231 B2 | 9/2003 | Mayersak |
| 6,647,340 B1 | 11/2003 | Pemble et al. |
| 6,691,066 B1 | 2/2004 | Brodie |
| 6,735,264 B2 | 5/2004 | Miller |
| 6,753,810 B1 | 6/2004 | Yang et al. |
| 6,799,116 B2 | 9/2004 | Robbins |
| 6,816,117 B2 | 11/2004 | Fink et al. |
| 6,856,905 B2 | 2/2005 | Pasturel et al. |
| 6,864,836 B1 | 3/2005 | Hatch et al. |
| 7,026,982 B2 | 4/2006 | Toda et al. |
| 7,158,885 B1 * | 1/2007 | Janky ............... H04K 1/00 701/484 |
| 7,219,013 B1 | 5/2007 | Young et al. |
| 7,289,061 B2 | 10/2007 | Komjathy et al. |
| 7,292,183 B2 | 11/2007 | Bird et al. |
| 7,298,325 B2 | 11/2007 | Krikorian et al. |
| 7,382,313 B1 | 6/2008 | Goad |
| 7,409,289 B2 | 8/2008 | Coatantiec et al. |
| 7,538,721 B2 | 5/2009 | Vollath et al. |
| 7,692,578 B2 | 4/2010 | Vollath et al. |
| 7,696,922 B2 | 4/2010 | Nicholson et al. |
| 7,746,272 B2 | 6/2010 | Vollath |
| 8,013,789 B2 | 9/2011 | Van et al. |
| 8,027,413 B2 | 9/2011 | Lillo et al. |
| 8,085,190 B2 | 12/2011 | Sengupta et al. |
| 8,089,402 B2 | 1/2012 | Maenpa et al. |
| 8,094,065 B2 | 1/2012 | Henkel |
| 8,134,497 B2 | 3/2012 | Janky et al. |
| 8,193,976 B2 | 6/2012 | Shen et al. |
| 8,255,155 B1 | 8/2012 | Crane et al. |
| 8,368,590 B2 | 2/2013 | Vollath et al. |
| 8,368,591 B2 | 2/2013 | Talbot et al. |
| 8,416,133 B2 | 4/2013 | Hatch et al. |
| 8,447,517 B2 | 5/2013 | Roh |
| 8,510,041 B1 | 8/2013 | Anguelov et al. |
| 8,542,146 B2 | 9/2013 | Vollath |
| 8,587,475 B2 | 11/2013 | Leandro |
| 8,610,624 B2 | 12/2013 | Savoy |
| 8,704,708 B2 | 4/2014 | Vollath |
| 8,704,709 B2 | 4/2014 | Vollath et al. |
| 8,756,001 B2 | 6/2014 | Georgy et al. |
| 8,760,343 B2 | 6/2014 | Milyutin et al. |
| 8,773,303 B2 | 7/2014 | Doucet et al. |
| 8,816,903 B2 | 8/2014 | Sengupta et al. |
| 8,825,456 B2 | 9/2014 | Vasudevan et al. |
| 8,830,121 B2 | 9/2014 | Vollath |
| 8,831,877 B2 | 9/2014 | Anguelov et al. |
| 8,847,820 B2 | 9/2014 | Landau et al. |
| 8,860,609 B2 | 10/2014 | Roh |
| 8,996,311 B1 | 3/2015 | Morin et al. |
| 9,031,782 B1 | 5/2015 | Lemay et al. |
| 9,069,073 B2 | 6/2015 | Ramakrishnan et al. |
| 9,128,176 B2 | 9/2015 | Seeger |
| 9,146,319 B2 | 9/2015 | Leandro |
| 9,182,497 B2 | 11/2015 | Geier et al. |
| 9,244,177 B2 | 1/2016 | Terashima |
| 9,405,012 B2 | 8/2016 | Doucet et al. |
| 9,405,016 B2 | 8/2016 | Yim |
| 9,417,330 B2 | 8/2016 | Revol et al. |
| 9,488,734 B2 | 11/2016 | Davain |
| 9,557,422 B1 | 1/2017 | Miller et al. |
| 9,568,321 B2 | 2/2017 | Bharadwaj et al. |
| 9,576,082 B2 | 2/2017 | Sparks et al. |
| 9,602,974 B2 | 3/2017 | Rudow et al. |
| 9,612,341 B2 | 4/2017 | Large et al. |
| 9,651,667 B2 | 5/2017 | Leandro et al. |
| 9,671,501 B2 | 6/2017 | Leandro et al. |
| 9,709,683 B2 | 7/2017 | Leandro et al. |
| 9,784,844 B2 | 10/2017 | Kana et al. |
| 9,857,474 B2 | 1/2018 | Tan et al. |
| 9,927,530 B2 | 3/2018 | Boyarski |
| 10,018,729 B2 | 7/2018 | Dunik et al. |
| 10,101,464 B2 | 10/2018 | Appleford et al. |
| 10,191,157 B2 | 1/2019 | Dai et al. |
| 10,260,888 B2 | 4/2019 | Takahashi |
| 10,267,924 B2 | 4/2019 | Ramanandan et al. |
| 10,274,606 B1 | 4/2019 | Phan et al. |
| 10,422,885 B2 | 9/2019 | Dai et al. |
| 10,459,593 B2 | 10/2019 | Tiwari et al. |
| 10,473,790 B2 | 11/2019 | Noble et al. |
| 10,564,296 B2 | 2/2020 | Hide et al. |
| 10,578,747 B2 | 3/2020 | Grgich et al. |
| 10,627,527 B2 | 4/2020 | Horn et al. |
| 10,677,933 B1 | 6/2020 | Gavrilets et al. |
| 10,690,775 B2 | 6/2020 | Jokinen |
| 10,802,160 B2 | 10/2020 | Dai et al. |
| 10,809,388 B1 | 10/2020 | Carcanague et al. |
| 10,901,096 B2 | 1/2021 | Thrasher et al. |
| 11,035,961 B2 | 6/2021 | Horn et al. |
| 11,131,774 B2 | 9/2021 | Miya et al. |
| 11,143,762 B2 | 10/2021 | Takahashi et al. |
| 11,156,718 B2 | 10/2021 | Takeda |
| 11,187,813 B2 | 11/2021 | Brandl et al. |
| 11,221,418 B2 | 1/2022 | Sleewaegen et al. |
| 11,237,276 B2 | 2/2022 | Kleeman |
| 11,255,976 B2 | 2/2022 | Strobel et al. |
| 11,259,141 B2 | 2/2022 | Li et al. |
| 11,300,689 B2 | 4/2022 | Noble et al. |
| 11,327,182 B2 | 5/2022 | Zalewski et al. |
| 11,333,772 B2 | 5/2022 | Del Regno et al. |
| 11,378,699 B2 | 7/2022 | Segal et al. |
| 11,422,269 B2 | 8/2022 | Ookubo et al. |
| 11,422,271 B2 | 8/2022 | Talbot et al. |
| 11,480,690 B2 | 10/2022 | Grgich et al. |
| 11,550,067 B2 | 1/2023 | Reimer et al. |
| 11,624,838 B2 | 4/2023 | Fine et al. |
| 11,693,120 B2 | 7/2023 | Angelo et al. |
| 11,733,397 B2 | 8/2023 | Reimer et al. |
| 11,953,608 B2 | 4/2024 | Hamada et al. |
| 2002/0097184 A1 | 7/2002 | Mayersak |
| 2002/0120400 A1 | 8/2002 | Lin |
| 2002/0180641 A1 | 12/2002 | Fink et al. |
| 2003/0081705 A1 | 5/2003 | Miller |
| 2003/0085840 A1 | 5/2003 | Benner et al. |
| 2004/0006424 A1 | 1/2004 | Joyce et al. |
| 2005/0001762 A1 | 1/2005 | Han et al. |
| 2005/0001763 A1 | 1/2005 | Han et al. |
| 2005/0024263 A1 | 2/2005 | Sharpe et al. |
| 2005/0114023 A1 | 5/2005 | Williamson et al. |
| 2005/0203702 A1 | 9/2005 | Sharpe et al. |
| 2006/0074558 A1 | 4/2006 | Williamson et al. |
| 2007/0055445 A1 | 3/2007 | Janky et al. |
| 2007/0120733 A1 | 5/2007 | Vollath et al. |
| 2007/0126629 A1 | 6/2007 | Krikorian et al. |
| 2008/0205521 A1 | 8/2008 | Van |
| 2009/0018772 A1 | 1/2009 | Watanabe et al. |
| 2009/0184869 A1 | 7/2009 | Talbot et al. |
| 2009/0224969 A1 | 9/2009 | Kolb |
| 2009/0243929 A1 | 10/2009 | Sengupta et al. |
| 2009/0262013 A1 | 10/2009 | Vollath |
| 2009/0273511 A1 | 11/2009 | Schroth |
| 2010/0033370 A1 | 2/2010 | Lopez et al. |
| 2010/0164789 A1 | 7/2010 | Basnayake |
| 2010/0207810 A1 | 8/2010 | Terashima |
| 2010/0283675 A1 | 11/2010 | Mcaree et al. |
| 2010/0324822 A1 | 12/2010 | Coatantiec et al. |
| 2011/0050497 A1 | 3/2011 | Maenpa et al. |
| 2011/0090116 A1 | 4/2011 | Hatch et al. |
| 2011/0122022 A1 | 5/2011 | Van et al. |
| 2011/0140959 A1 | 6/2011 | Vollath |
| 2011/0148698 A1 | 6/2011 | Vollath |
| 2011/0156949 A1 | 6/2011 | Vollath et al. |
| 2011/0187589 A1 | 8/2011 | Gaal et al. |
| 2011/0187590 A1 | 8/2011 | Leandro |
| 2011/0260914 A1 | 10/2011 | Vollath et al. |
| 2011/0267226 A1 | 11/2011 | Talbot et al. |
| 2011/0316740 A1 | 12/2011 | Waters et al. |

(56) References Cited

U.S. PATENT DOCUMENTS

| | | |
|---|---|---|
| 2012/0050097 A1 | 3/2012 | Zhang et al. |
| 2012/0112961 A1 | 5/2012 | Sengupta et al. |
| 2012/0146847 A1 | 6/2012 | Janky et al. |
| 2012/0154210 A1 | 6/2012 | Landau et al. |
| 2012/0154214 A1 | 6/2012 | Leandro |
| 2012/0154215 A1 | 6/2012 | Vollath et al. |
| 2012/0173195 A1 | 7/2012 | Opshaug et al. |
| 2012/0176271 A1 | 7/2012 | Dai et al. |
| 2012/0286991 A1 | 11/2012 | Chen et al. |
| 2013/0050020 A1 | 2/2013 | Peck et al. |
| 2013/0099970 A1 | 4/2013 | Lin et al. |
| 2013/0227377 A1 | 8/2013 | Rao et al. |
| 2013/0234885 A1 | 9/2013 | Geier et al. |
| 2013/0251150 A1 | 9/2013 | Chassagne |
| 2013/0265191 A1 | 10/2013 | Ghinamo |
| 2013/0271318 A1 | 10/2013 | Landau et al. |
| 2013/0325328 A1 | 12/2013 | Anguelov et al. |
| 2013/0335264 A1 | 12/2013 | Revol et al. |
| 2014/0002300 A1 | 1/2014 | Leandro et al. |
| 2014/0015712 A1 | 1/2014 | Leandro et al. |
| 2014/0062765 A1 | 3/2014 | Brenner |
| 2014/0062776 A1 | 3/2014 | Ferguson et al. |
| 2014/0077991 A1 | 3/2014 | Bar-Sever et al. |
| 2014/0184442 A1 | 7/2014 | Large et al. |
| 2014/0232592 A1 | 8/2014 | Psiaki et al. |
| 2014/0240172 A1 | 8/2014 | Milyutin et al. |
| 2014/0266876 A1 | 9/2014 | Tan et al. |
| 2014/0288825 A1 | 9/2014 | Czompo et al. |
| 2014/0375495 A1 | 12/2014 | Fleming et al. |
| 2015/0019464 A1 | 1/2015 | Nguyen-Tuong et al. |
| 2015/0168559 A1 | 6/2015 | Salazar et al. |
| 2015/0173037 A1 | 6/2015 | Pijl |
| 2015/0260848 A1 | 9/2015 | Mundt et al. |
| 2015/0270615 A1 | 9/2015 | Neenan |
| 2015/0293230 A1 | 10/2015 | Weed et al. |
| 2015/0293233 A1 | 10/2015 | De Jong |
| 2015/0369924 A1 | 12/2015 | Hedgecock et al. |
| 2016/0011318 A1 | 1/2016 | Cohen |
| 2016/0097859 A1 | 4/2016 | Hansen et al. |
| 2016/0116601 A1 | 4/2016 | Horn et al. |
| 2016/0195617 A1 | 7/2016 | Phatak et al. |
| 2016/0320493 A1 | 11/2016 | Wu et al. |
| 2016/0373263 A1* | 12/2016 | Zaidi .................. H04L 9/3265 |
| 2017/0010936 A1 | 1/2017 | Daoud et al. |
| 2017/0131407 A1 | 5/2017 | Dunik et al. |
| 2017/0192102 A1 | 7/2017 | Wietfeldt |
| 2017/0269216 A1 | 9/2017 | Dai et al. |
| 2017/0269222 A1 | 9/2017 | Dai et al. |
| 2017/0269231 A1 | 9/2017 | Dai et al. |
| 2017/0299730 A1 | 10/2017 | Lie et al. |
| 2017/0299731 A1 | 10/2017 | Lie et al. |
| 2017/0322313 A1 | 11/2017 | Revol et al. |
| 2018/0091939 A1 | 3/2018 | Venkatraman et al. |
| 2018/0113219 A1 | 4/2018 | Wuebbena |
| 2018/0120445 A1 | 5/2018 | Dill |
| 2018/0164442 A1 | 6/2018 | Thrasher et al. |
| 2018/0172838 A1 | 6/2018 | Junker et al. |
| 2018/0180743 A1 | 6/2018 | Hide et al. |
| 2018/0188032 A1 | 7/2018 | Ramanandan et al. |
| 2018/0246217 A1 | 8/2018 | Wuebbena |
| 2018/0252818 A1 | 9/2018 | Sato et al. |
| 2018/0283882 A1 | 10/2018 | He et al. |
| 2018/0299562 A1 | 10/2018 | Green |
| 2018/0306930 A1 | 10/2018 | Laine et al. |
| 2019/0004180 A1 | 1/2019 | Jokinen |
| 2019/0078895 A1 | 3/2019 | Ma et al. |
| 2019/0120970 A1* | 4/2019 | Vigen .................. G01S 19/215 |
| 2019/0154837 A1 | 5/2019 | Noble et al. |
| 2019/0187295 A1 | 6/2019 | Lee et al. |
| 2019/0187298 A1 | 6/2019 | Grgich et al. |
| 2019/0204450 A1 | 7/2019 | Revol |
| 2019/0243001 A1 | 8/2019 | Ookubo et al. |
| 2019/0302274 A1 | 10/2019 | Berntorp et al. |
| 2019/0339396 A1 | 11/2019 | Turunen |
| 2019/0383948 A1 | 12/2019 | Hoeferlin et al. |
| 2020/0025936 A1 | 1/2020 | Zhou et al. |
| 2020/0025937 A1 | 1/2020 | Kroeger et al. |
| 2020/0041654 A1 | 2/2020 | Noble et al. |
| 2020/0041658 A1 | 2/2020 | Laurichesse |
| 2020/0084586 A1* | 3/2020 | Rydén .................. H04W 76/40 |
| 2020/0096649 A1 | 3/2020 | Brandl et al. |
| 2020/0209406 A1 | 7/2020 | Lin et al. |
| 2020/0233056 A1 | 7/2020 | Dolgov et al. |
| 2020/0257002 A1 | 8/2020 | Henkel |
| 2020/0271795 A1 | 8/2020 | Horn et al. |
| 2020/0348422 A1 | 11/2020 | Carcanague et al. |
| 2020/0408926 A1 | 12/2020 | Carcanague et al. |
| 2021/0026374 A1 | 1/2021 | Burghardt et al. |
| 2021/0033735 A1 | 2/2021 | Kleeman |
| 2021/0116579 A1 | 4/2021 | Rezaei |
| 2021/0141099 A1 | 5/2021 | Gunnarsson et al. |
| 2021/0165104 A1 | 6/2021 | Zalewski et al. |
| 2021/0165111 A1 | 6/2021 | Zalewski |
| 2021/0215831 A1 | 7/2021 | Takeda |
| 2021/0255336 A1 | 8/2021 | Noble et al. |
| 2021/0372793 A1 | 12/2021 | Nikulin et al. |
| 2021/0405213 A1 | 12/2021 | Tuck et al. |
| 2022/0011443 A1 | 1/2022 | De Wilde et al. |
| 2022/0057523 A1 | 2/2022 | Lee |
| 2022/0058322 A1 | 2/2022 | Brandl et al. |
| 2022/0107427 A1 | 4/2022 | Kleeman et al. |
| 2022/0163677 A1 | 5/2022 | Muthuraman et al. |
| 2022/0171053 A1 | 6/2022 | Park et al. |
| 2022/0317310 A1 | 10/2022 | He et al. |
| 2022/0397684 A1 | 12/2022 | Kee et al. |
| 2023/0026395 A1 | 1/2023 | Reimer et al. |
| 2023/0140535 A1 | 5/2023 | Ma et al. |
| 2023/0184956 A1 | 6/2023 | Cole et al. |
| 2023/0280476 A1 | 9/2023 | Reimer et al. |

FOREIGN PATENT DOCUMENTS

| | | |
|---|---|---|
| CN | 101166995 A | 4/2008 |
| CN | 103197327 A | 7/2013 |
| CN | 103760573 A | 4/2014 |
| CN | 104236522 A | 12/2014 |
| CN | 104732085 A | 6/2015 |
| CN | 106338738 A | 1/2017 |
| CN | 106970404 A | 7/2017 |
| CN | 107085626 A | 8/2017 |
| CN | 105629263 B | 4/2019 |
| CN | 107422354 B | 6/2019 |
| CN | 110727002 A | 1/2020 |
| CN | 111272174 A | 6/2020 |
| CN | 109714421 B | 8/2021 |
| CN | 111624630 B | 2/2022 |
| CN | 114174850 A | 3/2022 |
| DE | 102017212603 A1 | 1/2019 |
| DE | 102018202223 A1 | 8/2019 |
| EP | 0244091 A2 | 11/1987 |
| EP | 0461557 B1 | 12/1997 |
| EP | 0940945 A2 * | 9/1999 |
| EP | 1729145 A1 | 12/2006 |
| EP | 2128841 A1 | 12/2009 |
| EP | 2602752 A1 | 6/2013 |
| EP | 1839070 B2 | 4/2014 |
| EP | 2966477 A1 | 1/2016 |
| EP | 2995975 A1 | 3/2016 |
| EP | 3035080 A1 | 6/2016 |
| EP | 2156214 B1 | 8/2018 |
| EP | 3627188 A1 | 3/2020 |
| EP | 3566021 B1 | 3/2021 |
| EP | 3809208 A1 | 4/2021 |
| EP | 3828595 A1 | 6/2021 |
| EP | 3963352 A1 | 3/2022 |
| KR | 101181990 B1 | 9/2012 |
| WO | 02061449 A1 | 8/2002 |
| WO | 2017046914 A1 | 3/2017 |
| WO | 2017070732 A1 | 5/2017 |
| WO | 2018188845 A1 | 10/2018 |

(56) References Cited

FOREIGN PATENT DOCUMENTS

| | | |
|---|---|---|
| WO | 2020214680 A1 | 10/2020 |
| WO | 2020240307 A1 | 12/2020 |

OTHER PUBLICATIONS

Schmitz, Martin, "RTCM State Space Representation Messages, Status and Plans", PPP-RTK & Open Standards Symposium, Mar. 12-13, 2012, Frankfurt, Germany.

Shapiro, Larry S., et al., "Rejecting Outliers and Estimating Errors in an Orthogonal-Regression Framework", Phil. Trans. R. Soc. Load. A (1995)350, 407-439. (Year:1995).

Skog, Isaac, et al., "A Low-Cost GPS Aided Inertial Navigation System for Vehicle Applications", 2005 13th European Signal Processing Conference, Sep. 4-8, 2005.

Snelson, Edward, et al., "Sparse Gaussian Process using Pseudo-inputs", NIPS'05: Proceedings of the 18th International Conference on Neural Information Processing Systems, Dec. 2005, pp. 1257-1264.

Subirana, J. Sanz, et al., "Carrier Phase Cycle-Slip Detection—Navipedia", https://gssc.esa.int/navipedia/index.php/Carrier_Phase_Cycle-Slip_Detection, published 2011.

Takasu, Tomoji, et al., "ION GNSS 2008 abstract submission Cycle slip detection and fixing by MEMS IMU/GPS integration for mobile environment RTK-GPS", Tokyo University of Marine Science and Technology, ION GNSS 2008, abstract submission.

Takenaka, et al., "Geolocation Correction for Geostationary Satellite Observations by a Phase-Only Correlation Method Using a Visible Channe", MPDI, Aug. 1, 2020, retrieved on Oct. 3, 2023. Retrieved from the internet <URL: http://www.mdpi.com/2072-4292/12/15/2472>.

Tanedo, Flip, "Notes on non-holonomic constraints", For P3318, Spring 2013, https://www.physics.uci.edu/~tanedo/files/teaching/P3318S13/Sec_05_nonholonomic.pdf.

Teunissen, P.J.G., "GNSS Integer Ambiguity Validation: Overview of Theory and Methods", Proceedings of the ION 2013 Pacific PNT Meeting, Apr. 23-25, 2013, Marriott Waikiki Beach Resort & Spa, Honolulu, Hawaii, https://www.ion.org/publications/abstract.cfm?articleID=11030.

Teunissen, Peter J.G., et al., "Integer Aperture Estimation A Framework for GNSS Ambiguity Acceptance Testing", InsideGNSS, Mar./Apr. 2011, pp. 66-73, www.insidegnss.com.

Teunissen, P.J.G., "On the GPS widelane and its decorrelating property", Delft Geodetic Computing Centre, Journal of Geodesy (1997) 71: 577-587.

Thombre, Sarang, et al., "GNSS Threat Monitoring and Reporting: Past, Present, and a Proposed Future", The Journal of Navigation, Dec. 2017, DOI: 10.1017/S0373463317000911, https://www.researchgate.net/publication/321663256.

Titsias, Michael K., "Variational Learning of Inducing Variables in Sparse Gaussian Processes", http://proceedings.mlr.press/v5/titsias09a/titsias09a.pdf, 2009.

Urquhart, Landon, "An Analysis of Multi-Frequency Carrier Phase Linear Combinations for GNSS", Department of Geodesy and Geomatics Engineering, University of New Brunswick, Technical Report No. 263, Feb. 2009.

Urquhart, Landon, et al., "Innovation: Integrity for safe navigation", https://www.gpsworld.com/innovation-integrity-for-safe-navigation-provided-by-gnss-service/, GPS World, Feb. 12, 2020.

Van Diggelen, Frank, et al., "Google to improve urban GPS accuracy for apps", Dec. 9, 2020, Android Developers Blog.

Van Graas, Frank, et al., "Precise Velocity Estimation Using a Stand-Alone GPS Receiver", Abstract only, Journal of The Institute of Navigation, vol. 51, No. 4, Winter 2004-2005, pp. 283-292, https://www.ion.org/publications/abstract.cfm?articleID=102384.

Verhagen, S., "The GNSS integer ambiguities: Estimation and validation", Aerospace Engineering, Jan. 31, 2005.

Waserman, Eyal, et al., "A Mixed Integer Least-Squares Formulation of the GNSS Snapshot Positioning Problem", https://github.com/eyalw711/snapshot-positioning, Jun. 2, 2021.

Won, Dachee, et al., "Performance Improvement of Inertial Navigation System by Using Magnetometer with Vehicle Dynamic Constraints", Hindawi, vol. 2015, published 2015, Article ID 435062, https://doi.org/10.1155/2015/435062, https://www.hindawi.com/journals/js/2015/435062/.

Wubbena, Gerhard, et al., "PPP-RTK: Precise Point Positioning Using State-Space Representation in RTK Networks", Presented at the 18th International Technical Meeting, ION GNSS-05, Sep. 13-16, 2005, Long Beach, California.

Wubbena, Gerhard, et al., "RTK Networks based on Geo++ GNSMART—Concepts, Implementation, Results", ION GPS 2001, Sep. 11-14, 2001, Salt Lake City, UT.

Yang, Wenhao, et al., "An Improved Relative GNSS Tracking Method Utilizing Single Frequency Receivers", Sensors 2020, 20, 4073; doi:10.3390/s20154073 www.mdpi.com/journal/sensors, 19 pages.

Zhu, Ni, et al., "GNSS Position Integrity in Urban Environments: A Review of Literature", IEEE Transactions on Intelligent Transportation Systems, 2018, 17p., 10.1109/TITS.2017.2766768.hal-01709519.

"An Introduction to GNSS, Chapter 4, GNSS Error Sources", https://novatel.com/an-introduction-to-gnss/chapter-4-gnsserror-sources, published 2015.

"Geo++ SSR For Network-RTK, PPP and PPP-RTK", https://geopp.de/wp-content/uploads/2020/09/SSR_Flyer_v3.pdf, Sep. 2015.

"IGS State Space Representation (SSR) Format Version 1.00", International GNSS Service (IGS), Oct. 5, 2020.

"Integrity-Navipedia", https://gssc.esa.int/navipedia/index.php/Integrity, published 2011.

"Phase II of the GNSS Evolutionary Architecture Study", https://www.faa.gov/about/office_org/headquarters_offices/ato/service_units/techops/navservices/gnss/library/documents/media/geasphaseii_final.pdf, Feb. 2010.

"Raim", GMV, 2011, Raim.

"Safe Position Augmentation for Real-Time Navigation (SPARTN) Interface Control Document Version 1.8.0", Jan. 2020, Sapcorda Services GmbH.

"Swift Navigation Binary Protocol", Version 3.4.5, Mar. 10, 2021, pp. 1-156.

Altmayer, Christian, "Cycle Slip Detection and Correction by Means of Integrated Systems", ION Institute of Navigation, Proceedings of the 200 National Technical Meeting of the Institute of Navigation, Abstract, Jan. 26-28, 2000.

Blanch, Juan, et al., "RAIM with Optimal Integrity and Continuity Allocations Under Multiple Failures", IEEE Transactions on Aerospace and Electronic Systems, vol. 46, No. 3, Jul. 2010.

Brack, A., "Optimal Estimation of a Subset of Integers With Application to GNSS", Artificial Satellites, vol. 51, No. 4—2016 DOI: 10.1515/arsa-2016-0011.

Brocard, Philippe, "Integrity monitoring for mobile users in urban environment", https://tel.archives-ouvertes.fr/tel-01379632/document, submitted Oct. 11, 2016.

Bruno, Jon, et al., "A realistic simulation framework to evaluate ionospheric tomography", Advances in Space Research 65 (2020) 891-901.

Cassel, Ryan, "Real-Time ARAIM Using GPS, GLONASS, and GALILEO", Submitted in partial fulfillment of the requirements for the degree of Master of Science in Mechanical and Aerospace Engineering in the Graduate College of the Illinois Institute of Technology, May 2017.

Chiu, David S., et al., "Bierman-Thornton UD Filtering for Double-Differenced Carrier Phase Estimation Accounting for Full Mathematical Correlation", Jan. 2008, ION NTM 2008, pp. 756-762., Jun. 23, 2017 00:00:00.0.

Davidson, Pavel, et al., "Improved Vehicle Positioning in Urban Environment through Integration of GPS and Low-Cost Inertial Sensors", European Navigation Conference, ENC-GNSSAt: Naples, Italy, May 2009.

(56) References Cited

OTHER PUBLICATIONS

Drescher, Ralf, "Fast convergence of Trimble CenterPoint RTX by regional augmentation", Trimble Terrasat GmbJ, Munich, EGU General Assembly 2015, Vienna, Thursday, Apr. 16, 2015.
Favey, Etienne, et al., "Dead reckoning fills-in GPS navigation gap", EE Times, Automotive Designline, Aug. 18, 2011.
Feng, Shaun, et al., "Carrier phase-based integrity monitoring for high-accuracy positioning", GPS Solution, Apr. 2009.
Gratton, Livio, et al., "Carrier Phase Relative RAIM Algorithms and Protection Level Derivation", Journal of Navigation (2010), 63, 215-231, doi: 10.1017/S0373463309990403.
Gunning, Kazuma, et al., "Design and evaluation of integrity algorithms for PPP in kinematic applications", Proceedings of the 31st International Technical Meeting of the Satellite Division of The Institute of Navigation (ION GNSS+ 2018) Sep. 24-28, 2018, Hyatt Regency Miami, Miami, Florida.
Henkel, Patrick, et al., "Joint L-/C-Band Code and Carrier Phase Linear Combinations for Galileo", International Journal of Navigation and Observation, vol. 2008, Article ID 651437, 8 pages.
Hirokawa, Dr. Rui, "Recent Activity of International Standardization for High-Accuracy GNSS Correction Service", Mitsubishi Electric, Jun. 27, 2019.
Huang, Panpan, "Airborne GNSS PPP Based Pseudolite System", School of Civil and Environmental Engineering Faculty of Engineering UNSW. Jun. 2019.
Brahim, Hassan E., et al., "A Regional Stochastic Model for NOAA-Based Residual Tropospheric Delay", ION NTM 2008, Jan. 28-30, 2008, San Diego, CA.
Karaim, Malek, et al., "GNSS Error Sources", https://www.intechopen.com/books/multifunctional-operation-and-application-of-gps/gnss-error-sources, published Apr. 6, 2018.
Khanafseh, Samer, et al., "GNSS Multipath Error Modeling for Automotive Applications", Abstract only, Proceedings of the 31st International Technical Meeting of the Satellite Division of The Institute of Navigation (ION GNSS+ 2018), Miami, Florida, Sep. 2018, pp. 1573-1589, https://www.ion.org/publications/abstract.cfm?articleID=16107.
Kilic, Cagri, et al., "ZUPT Aided GNSS Factor Graph with Inertial Navigation Integration for Wheeled Robots", Proceedings of the 34th International Technical Meeting of the Satellite Division of The Institute of Navigation (ION GNSS+ 2021) Sep. 20-24, 2021.
Kissai, Ali, et al., "UAV Dead Reckoning with and without using INS/ GPS Integrated System in GPS denied Polar Region", International Journal of Aeronautics and Aerospace Engineering, ISSN: 2643-8224, 10 pages, published Aug. 26, 2019.
Ko, Jonathan, et al., "GP-UKF: Unscented kalman filters with Gaussian process prediction and observation models", Conference Paper, Dec. 2007, 10.1109/IROS.2007.4399284.
Kuusniemi, Heidi, et al., "GNSS Signal Reliability Testing in Urban and Indoor Environments", Proceedings of NTM 2004 Conference (Session A2), San Diego, CA, Jan. 26-28, 2004, The Institute of Navigation.
Lee, Jae Ho, et al., "A Two-antenna GPS Receiver Integrated with Dead Reckoning Sensors", ION Institute of Navigation, Proceedings of the IAIN Work Congress and the 56th Annual Meeting of the Institute of Navigation, Jun. 26-28, 2000, 4 pages.
Lei, Yu, et al., "Prediction of Navigation Satellite Clock Bias by Gaussian Process Regression", Lecture Notes in Electrical Engineering 342:411-423, Jan. 2015.
Li, T., et al., "Some remarks on GNSS integer ambiguity validation methods", Survey Review, Dec. 5, 2012, vol. 44, No. 326.
Lim, Cheol-Soon, et al., "Feasibility Study on Integration of SSR Correction into Network RTK to Provide More Robust Service", JPNT 7(4), 295-305 (2018).
Lin, Ming, et al., "Robust Gaussian Process Regression for Real-Time High Precision GPS Signal Enhancement", www.gps.gov/systems/gps/performance/accuracy, Jun. 5, 2019.
Liu, Haiying, et al., "A closed-loop EKF and multi-failure diagnosis approach for cooperative GNSS positioning", Engineering, GPS Solutions, Published 2015.

Madrid, Navarro, et al., "New Approach for Integrity Bounds Computation Applied to Advanced Precise Positioning Applications", Proceedings of the 28th International Technical Meeting of the Satellite Division of The Institute of Navigation (ION GNSS+ 2015) Sep. 14-18, 2015, Tampa Convention Center, Tampa, Florida.
Meng, Xiaoli, et al., "A Robust Vehicle Localization Approach Based on GNSS/IMU/DMI/LIDAR Sensor Fusion for Autonomous Vehicles", Sensors, 2017, 17, 2140.
Odijk, Dennis, et al., "On the estimability of parameters in undifferenced, uncombined GNSS network and PPP-RTK user models by means of S-system theory", Journal of Geodesy, Nov. 2015.
Peng, Hao, et al., "Covariance Fusion Strategy of Gaussian Processes Covariance and Orbital Prediction Uncertainty", Conference: AAS/AIAA Astrodynamics Specialist Conference, Portland, ME, Aug. 2019.
Pervan, Boris, et al., "Shaping Aviation Integrity Two RAIMs for Safety", GPS World The Business and Technology of Global Navigation and Positioning, Apr. 1, 2008.
Phelts, R. Eric, et al., "Innovation: Improving ARAIM, An approach using precise point positioning", GPS World, Jun. 13, 2020, https://www.gpsworld.com/innovation-improving-araim/.
Pullen, Sam, "Augmented GNSS: Fundamentals and Keys to Integrity and Continuity", Department of Aeronautics and Astronautics, Stanford University, Stanford, CA 94305-4035 USA, Tuesday, Sep. 20, 2011 1:30-5:00 PM Oregon Convention Center, Portland, Oregon.
Rasmussen, C.E., et al., "Gaussian Processes for Machine Learning", MIT Press, 2006, ISBN 026218253X. c 2006 Massachusetts Institute of Technology, (Year: 2006).
Rodriguez-Solano, Carlos, et al., "Protection Level of the Trimble RTX Positioning Engine for Autonomous Applications", Proceedings of the 34th International Technical Meeting of the Satellite Division of The Institute of Navigation (ION GNSS+ 2021), Sep. 20-24, 2021.
Rothacher, M., et al., "ANTEX: The Antenna Exchange Format, Version 1.4", Sep. 15, 2010, IGC International GNSS Service, https://kb.igs.org/hc/en-us/articles/216104678-ANTEX-format-description.
Satirapod, Chalermehon, "Improving the GPS Data Processing Algorithm for Precise Static Relative Positioning", School of Surveying and Spatial Information Systems The University of New South Wales. Jan. 2002.
Schmid, R., et al., "Estimation of elevation-dependent satellite antenna phase center variations of GPS satellites", Journal of Geodesy (2003) 77: 440-446, May 19, 2003, DOI 10.1007/s00190-003-0339-0.
Schmid, Ralf, et al., "From Relative Absolute Antenna Phase Center Corrections", Conference: IGS Workshop and Symposium 2004.
"Navstar GPS Space Segment/Navigation User Segment Interfaces", IS-GPS-200L, 228 pages (Year: 2020), May 14, 2020.
"Road vehicles Functional safety Part 1: Vocabulary", ISO 26262-1:2018, https://www.iso.org/standard/68383.html, Abstract, published Dec. 2018.
"The First in China | Bynav Alice GNSS SOC Awarded ISO 26262 Asil B Functional Safety Product Certification", Gasgoo, https://autonews.gasgoo.com/m/70028360.html, Sep. 22, 2023.
"Wikipedia (Covariance matrix)", https://en.wikipedia.org/wiki/Covariance_matrix, downloaded May 2, 2023 (Year: 2023).
Angelo, Joseph, et al., "System and Method for Detecting Outliers in GNSS Obervations", U.S. Appl. No. 18/116,117, filed Mar. 1, 2023.
Berntorp, Karl, et al., "Bayesian Sensor Fusion of GNSS and Camera With Outlier Adaptation for Vehicle Positioning", Mitsubishi Electric Research Laboratories, https://www.merl.com, Aug. 6, 2022.
Bijl, Hildo, et al., "Online sparse Gaussian process regression using FITC and PITC approximations", IFAG-Papers On Line vol. 48, Issue 28, 2015, pp. 703-708 (Year: 2015).
Boda, Aaron, "Cycle Slip Detection using PVA Kalman Filter", Technical Report • Dec. 2017.

(56) References Cited

OTHER PUBLICATIONS

Brocard, Philippe, et al., "System and Method for Bounding a Satellite Positioning Solution Integrity", U.S. Appl. No. 18/537,212, filed Dec. 12, 2023.
Brocard, Philippe, et al., "System and Method for Distributed Integrity Monitoring", U.S. Appl. No. 18/491,167, filed Oct. 20, 2023.
Chen, Liang, et al., "GNSS High-Precision Augmentation for Autonomous Vehicles: Requirements, Solution, and Technical Challenges", Remote Sens. 2023,15,1623. https://doi.org/ 10.3390/rs15061623.
Cole, D.A., et al., "Locally induced Gaussian processes for large-scale simulation experiments", Stat Comput 31, 33 (2021). https://doi.org/10.1007/s11222-021-10007-9 (Year: 2021).
Collin, Jussi, et al., "TKT-2546 Methods for Positioning", Tampere University of Technology, 2010, 50 pages.
Ding, Wei, et al., "Carrier Phase-Based Precise Heading and Pitch Estimation Using a Low-Cost GNSS Receiver", Remote Sens. 2021,13,3642. https://doi.org/ 10.3390/rs13183642.
Erickson, Collin B., et al., "Comparison of Gaussian Process Modeling Software", European Journal of Operational Research 266 (2018) 179-192 (Year: 2018).
Farrell, James L., "Carrier Phase Processing Without Integers", ION 57th Annual Meeting/CIGTF 20th Biennial Guidance Test Symposium, Jun. 11-13, 2001, Albuquerque, NM.
Freda, Peirluigi, et al., "Time-differenced carrier phases technique for precise GNSS velocity estimation", GPS Solut, DOI 10.1007/s10291-014-0425-1, published online Dec. 31, 2014.
Gargiulo, Gianluca, et al., "GNSS Integrity and protection level computation for vehicular applications", Conference: Proceedings of 16th Ka and broadband communications—navigation and earth observation conference, Jan. 2010, https://www.researchgate.net/publication/239949398_GNSS_Integrity_and_protection_level_computation_for_vehicular_applications.
Geng, Jianghui, et al., "Toward global instantaneous decimeter-level positioning using tightly coupled multi-constellation andmulti-frequency GNSS", Journal of Geodesy, vol. 92, p. 977-991 (Year: 2019).
George, Jitin, "C2000 MCU SafeTI control solutions: An introduction to ASIL decomposition and SIL synthesis", Texas Instruments, Apr. 2019.
Inyurt, Samed, et al., "Ionospheric TEC Forecasting Using Gaussian Process Regression (GPR) and multiple Linear Regression (MLR) in X Turkey", Astrophys Space Sci (2020) 365:99, https://doi.org/10.1007 / s10509-020-03817-2 (Year: 2020).
Karaim, Malek, et al., "GPS Cycle Slip Detection and Correction at Measurement Level", British Journal of Applied Science & Technology 4(29): 4239-4251, 2014.
Kim, Jungbeom, et al., "A Low-Cost High-Precision Vehicle Navigation System for Urban Environment Using Time Differenced Carrier Phase Measurements", Proceedings of the 2020 International Technical Meeting, 597 ION ITM 2020, San Diego, California, Jan. 21-24, 2020, https://doi.org/10.33012/2020.17164.
Lin, Ming, et al., "Robust Gaussian Process Regression for Real-Time High Precision GPS Signal Enhancement", Applied Data Science Track Paper. KDD '19, Aug. 4-8, 2019, Anchorage, AK, USA (Year: 2019).
Madani, Kurosh, et al., "Studies in Computational Intelligence", Revised and Selected Papers of the International Joint Conference, IJCCI 2011, Paris, France, Oct. 24-26, 2011.
Maybeck, Peter S., "Stochastic models, estimation, and control", vol. 1, Academic Press, p. 1-16, 133-134, 169-176, 203-220, 275-276, 289-306, 341-362, 411-423 (Year: 1979).
Mobarak, Jason, et al., "System and Method for GNSS Correction Transmission", U.S. Appl. No. 18/244,567, filed Sep. 11, 2023.
Nathan, Aaron, "Point One Navigation Launches ASIL Positioning Engine to Enable Safe and Precise Autonomous Vehicles", Point One Navigation, Dec. 19, 2022, https://pointonenav.com/news/point-one-navigation-launches-asil-positioning-engine/.
Ogaja, Clement A., "Applied GPS for Engineers and Project Managers", ASCE Press, p. 177-179 (Year: 2011).
Parkins, Alexander James, "Performance of precise marine positioning using future modernised global satellite positioning systems and a novel partial ambiguity resolution technique Department of Civil", Environmental and Geomatic Engineering, Aug. 2009.
Parkins, Alex, et al., "System and Method for GNSS Correction Monitoring", U.S. Appl. No. 18/503,662, filed Nov. 7, 2023.
Petovello, Mark, "How does a GNSS receiver estimate velocity?", Inside GNSS, Mar./Apr. 2015, www.insidegnss.com.
Pongsakornsathien, Nichakorn, et al., "A Performance-Based Airspace Model for Unmanned Aircraft Systems Traffic Management", Aerospace, vol. 7(154), 26 pages (Year: 2020).
Quinonero-Candel, Joaquin, et al., "A Unifying View of Sparse Approximate Gaussian Progress Regression", Journal of Machine Learning Research 6 (2005) 1939-1959. (Year: 2005).
Reimer, Christian, et al., "System and Method for Fusing Sensor and Satellite Measurements for Positioning Determination", U.S. Appl. No. 18/115,963, filed Mar. 1, 2023.
Richardson, Julian, "Flexible Generation of Kalman Filter Code", NASA Technical Reports Server (NTRS), Document ID 20060019115, Jan. 1, 2006.
Roysdon, Paul F., et al., "GPS-INS Outlier Detection & Elimination using a Sliding Window Filter", 2017 American Control Conference (ACC), May 24-26, 2017, Seattle, WA, USA.
Sleewaegen, Jean-Marie, et al., "Galileo E5b Rover Receiving E5a Corrections? No Problem!", 32nd International Technical Meeting of the Satellite Division of the Institute of Navigation (ION GNSS+ 2019), Miami, Florida, Sep. 16-20, 2019.
Smolyakov, Ivan, et al., "System and Method for Determining GNSS Corrections", U.S. Appl. No. 18/241,542, filed Sep. 1, 2023.
Takasu, Tomojii, et al., "Kalman-Filter-Based Integer Ambiguity Resolution Strategy for Long-Baseline RTK with Ionosphere and Troposphere Estimation", Tokyo University of Marine Science and Technology, Japan, revised Oct. 3, 2010—11 pages.
Teunissen, P.J.G., "The least-squares ambiguity decorrelation adjustment: its performance on short GPS baselines and short observation spans", Journal of Geodesy, (1997) 71: 589-602, 14 pages.
Wang, Yuechen, et al., "Real-time integrity monitoring for a wide area precise positioning system", Satell Navig (2020) 1:24.
Ward, D. D., et al., "The Uses and Abuses of Asil Decomposition in ISO 26262", 7th IET International Conference on System Safety, incorporating the Cyber Security Conference 2012.
Watanabe, Yoko, et al., "Fault-tolerant final approach navigation for a fixed-wing UAV by using long-range stereo camera system", 2020 International Conference on Unmanned Aircraft Systems (ICUAS) Athens, Greece, Sep. 1-4, 2020.
Weiss, Berntrop K., et al., "GNSS Ambiguity Resolution by Adaptive Mixture Kalman Filter", TR2018-103, Jul. 13, 2018.
Wendel, J., et al., "Time-Differenced Carrier Phase Measurements for Tightly Coupled GPS/INS Integration", 0-7803-9454-2/06/$20.00/ © 2006 IEE, Jul. 5, 2006, 2006 IEEE/ION Position, Location, And Navigation Symposium, Date of Conference: Apr. 25-27, 2006.
Xiao, Guorui, "A computationally efficient approach for isolating satellite phase fractional cycle biases based on Kalman filter", 19th EGU General Assembly, EGU2017, proceedings for the conference held Apr. 23-28, 2017 in Vienna., p. 12495.
Yang, Y., et al., "L1 Backup Navigation for Dual Frequency GPS Receiver", Proceedings of the 16th International Technical Meeting of the Satellite Division of The Institute of Navigation (ION GPS/GNSS 2003), Portland, OR, Sep. 2003, pp. 1258-1263.
Zair, Salim, et al., "Outlier Detection in GNSS Pseudo-Range/Doppler Measurements for Robust Localization", Sensors 2016, 16, 580; doi:10.3390/s16040580, www.mdpi.com/journal/sensors.

* cited by examiner

SYSTEM AND METHOD FOR GNSS CORRECTION TRANSMISSION

CROSS-REFERENCE TO RELATED APPLICATIONS

This application claims the benefit of U.S. Provisional Application No. 63/405,616 filed 12 Sep. 2022 and U.S. Provisional Application No. 63/411,337 filed 29 Sep. 2022, each of which is incorporated in its entirety by this reference.

TECHNICAL FIELD

This invention relates generally to the GNSS positioning field, and more specifically to a new and useful system and method in the GNSS positioning field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

2. Overview

Figure 1:
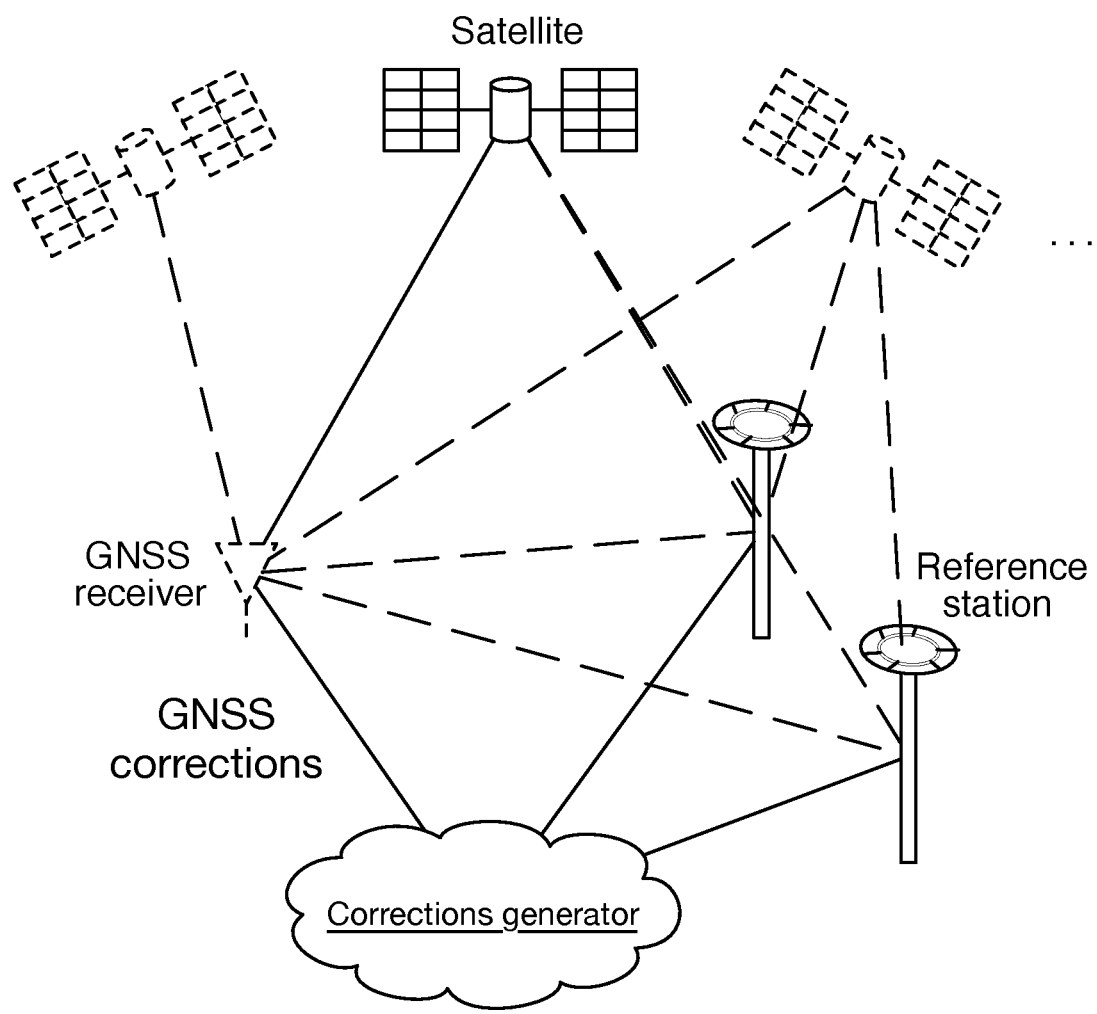
FIG. 1 is a schematic representation of an embodiment of the apparatus.
Figure 3:
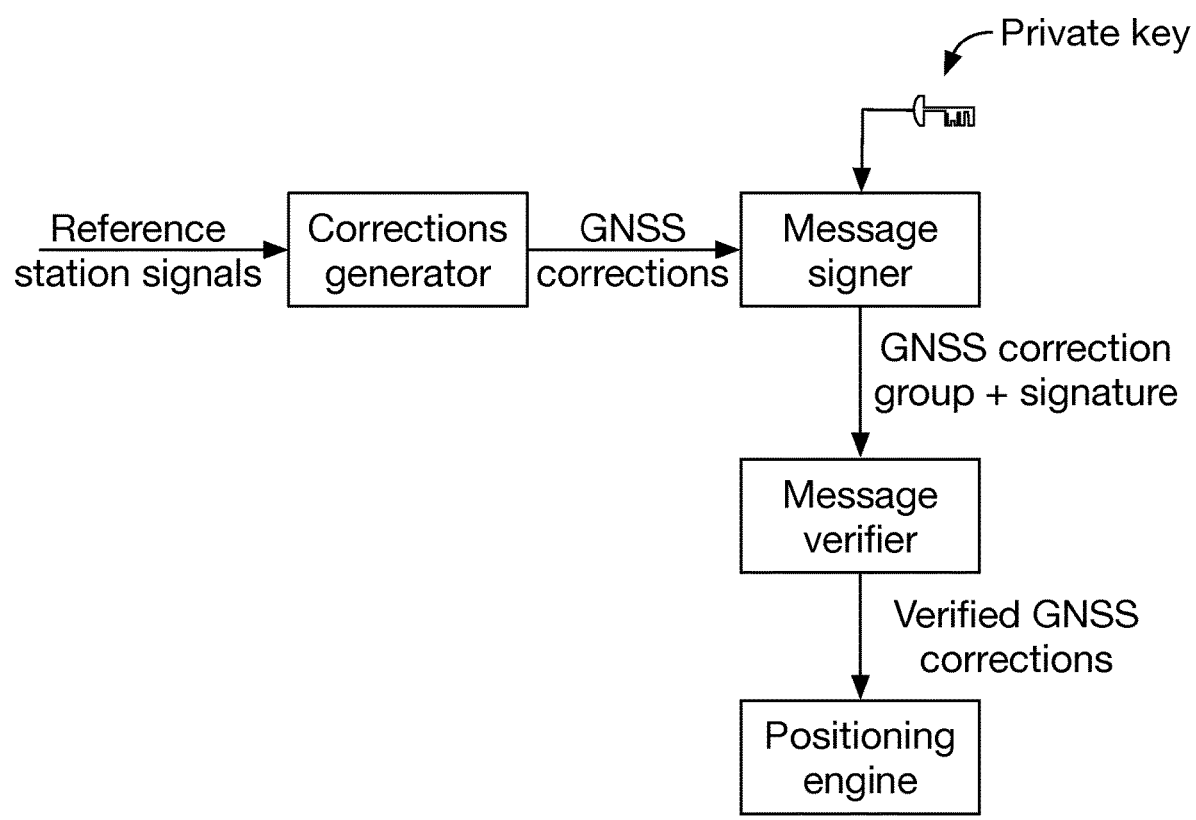
FIG. 3 is a schematic representation of an example of data flow within the system.

As shown for example in FIG. 1, the system can include a data source (e.g., one or more satellites, one or more reference station, sensors, etc.), a computing system, a GNSS receiver, and/or any suitable component(s). As shown for example in FIG. 3, the computing system can include a correction generator, a message generator (e.g., a message signer), a proxy, a message verifier, a positioning engine, and/or any suitable component(s).

Figure 2:
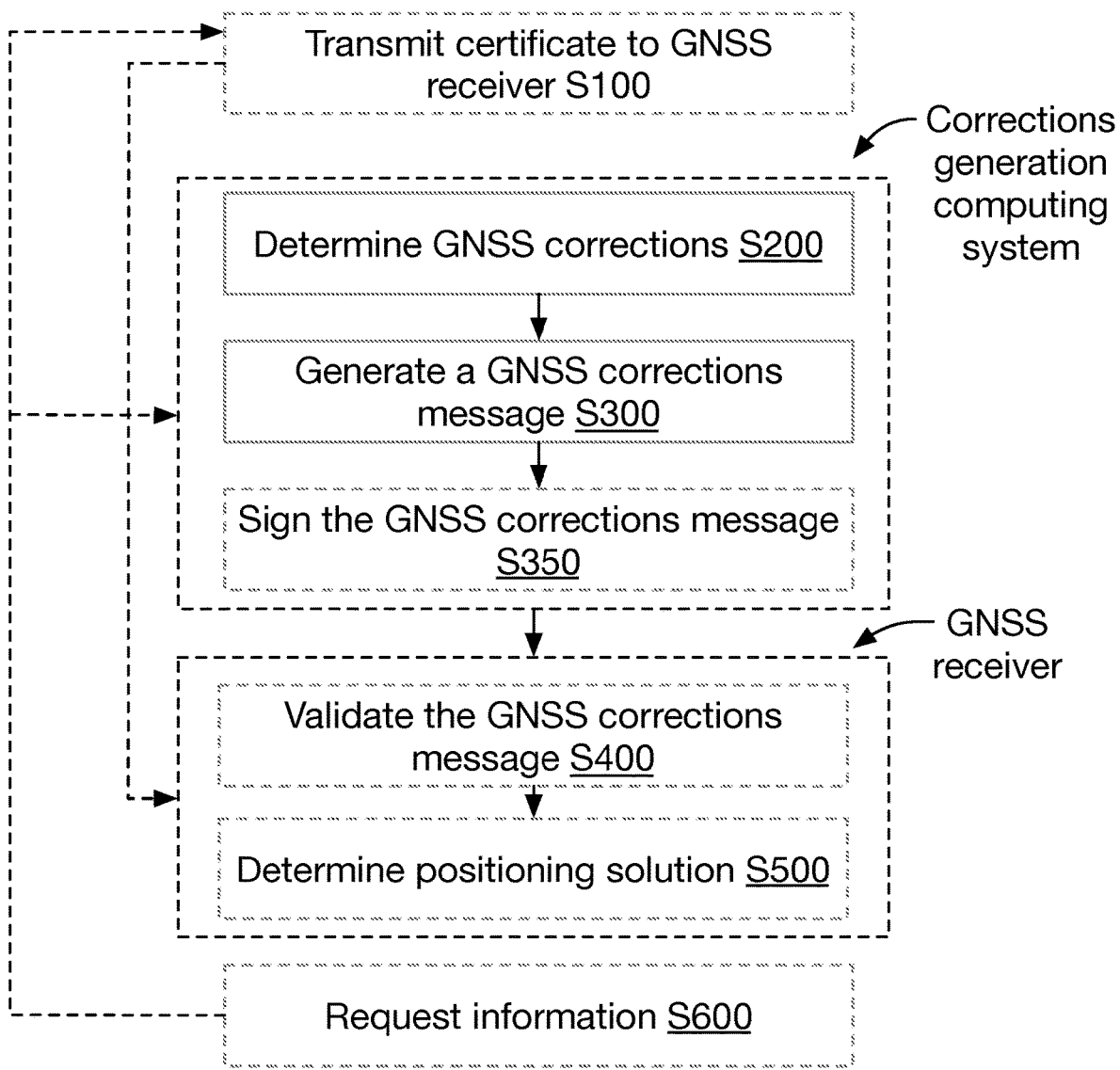
FIG. 2 is a schematic representation of an embodiment of the method.

As shown in FIG. 2, the method can include: optionally, transmitting a certificate S100; determining GNSS corrections S200; generating a GNSS corrections message S300; optionally, validating the GNSS corrections message S400; optionally, determining a positioning solution S500; and/or any suitable steps or processes. Generating the GNSS corrections message can include signing the GNSS corrections message.

The system and/or method preferably function to secure GNSS corrections such that the GNSS corrections are unlikely to be corrupted (e.g., from malicious actors such as spoofing, hacking, etc.; unintentional corruption such as data dropping; etc.). Securing the GNSS corrections can be beneficial, for instance, for safety-critical applications and/or applications that aim to achieve a high integrity (e.g., a target integrity risk (TIR)<$10^{-4}$/hr, <$10^{-5}$/hr, <$10^{-6}$/hr, <$10^{-7}$/hr, <$10^{-8}$/hr, etc.) and/or high accuracy (e.g., accuracy of ±1 mm, ±5 mm, ±1 cm, ±2 cm, ±5 cm, ±1 dm, ±2 dm±5 dm, ±1 m, ±5 m, etc.) positioning solution. However, the system and/or method can otherwise be beneficial and/or can otherwise function.

Embodiments of the system and/or method can be used, for example, in autonomous or semi-autonomous vehicle guidance (e.g., for unmanned aerial vehicles (UAVs), unmanned aerial systems (UAS), self-driving cars, agricultural equipment, robotics, rail transport/transit systems, autonomous trucking, last mile delivery, etc.), GPS/GNSS research, surveying systems, user devices, mobile applications, internet-of-things (IOT) devices, and/or may be used in any other suitable application. In specific examples, the system (and/or components) can be coupled to any suitable external system such as a vehicle (e.g., UAV, UAS, car, truck, etc.), robot, railcar, user device (e.g., cell phone), and/or any suitable system, and can provide positioning data, integrity data (e.g., protection level data), and/or other data to said system, wherein the system can use the data for control and/or navigation.

2. Benefits

Variations of the technology can confer several benefits and/or advantages.

First, variants of the technology can be used to check whether GNSS corrections have been corrupted. For example, the inclusion of a signature message can be used to verify GNSS corrections associated with the signature message.

Second, variants of the technology can enhance the security (e.g., resilience to corruption) of the GNSS corrections with a modest increase in the size of a data stream containing GNSS corrections. For instance, by grouping GNSS corrections and verifying the group of GNSS corrections, the size of the GNSS corrections (e.g., corrections message) can have a modest increase in size (e.g., at most 127 bytes per message, 255 bytes per message, 511 bytes per message, 1027 bytes per message, 2055 bytes per message, etc.). The amount of overhead from the data stream can depend on the message grouping (e.g., smaller groups can result in larger overhead) and/or can depend on any suitable data or information.

However, variants of the technology can confer any other suitable benefits and/or advantages.

3. System

The system can use a set of data collected by one or more data sources. Data sources can include: receivers, sensors (e.g., located onboard the receiver, the external system, a reference station, etc.), databases, reference stations, satellites, and/or any other suitable data source. Examples of data that can be used include: satellite signals (e.g., satellite observations), sensor data, and/or any other suitable data.

The GNSS receiver preferably functions to measure a set of satellite observations (e.g., satellite signals) from one or more satellites. In variants, the GNSS receiver (e.g., a processor or measurement engine thereof) can determine the location (e.g., by using pseudorange, by using carrier phase) of the GNSS receiver (e.g., the receiver antenna, the external system, the rover, etc.) based on the satellite observations and/or sensor readings. The GNSS receiver can be in communication with a computing system, can include a computing system (e.g., a processor, a positioning engine, a fusion engine, etc.), can be integrated with the computing system, and/or the GNSS receiver and computing system can be arranged in any suitable manner. The GNSS receiver can be a stand-alone device (e.g., a stand-alone antenna or set of antennas), can be integrated into the rover (e.g., be a component of an automobile, aero vehicle, nautical vehicle, etc.), can be (e.g., be included in, be a component of, be a chip of, etc.) a user device (e.g., smart phone, laptop, cell phone, smart watch, etc.), and/or can be configured in any suitable manner.

The set of satellite observations can include orbital data, timestamp, range rate data, carrier phase data, pseudorange data, doppler data, and/or any suitable data. The set of satellite observations can be associated with metadata (e.g., ephemeris), and/or any suitable data. The set of satellite observations can include satellite observations corresponding to satellites from one or more satellite constellation (e.g., Global Positioning System (GPS), GLObal Navigation Satellite System (GLONASS), BeiDou positioning System (BDS), Galileo, Navigation with Indian Constellation (NavIC), Quasi-Zenith Satellite System (QZSS), GPS Aided Geo Augmented Navigation (GAGAN), etc.). The set of satellite observations can additionally or alternatively include data from an augmentation system (e.g., Satellite Based Augmentation System (SBAS) such as Wide Area Augmentation System (WAAS), European Geostationary Navigation Overlay Service (EGNOS), Multi-Functional Satellite Augmentation System (MSAS), Omnistar, StarFire, etc.; Ground Based Augmentation Systems (GBAS) such as Local Area Augmentation System (LAAS); etc.), and/or can include any suitable data.

In variants of the system including more than one GNSS receiver (e.g., more than one antenna), each GNSS receiver can be the same or different, which can function to provide redundancy, provide information in the event of an outage to one of the antennas, provide validation and/or cross checks between data sources, and/or otherwise function. For example, different GNSS receivers can be configured to receive satellite observations associated one or more satellite constellations, one or more carrier frequencies (e.g., L1, L1C, L2, L3, L5, L6, E1, E5a, E5b, E5altboc, E5, E6, G1, G3, B1I, B1C, B2I, B2a, B3I, LEX, S band, etc. frequencies), and/or corresponding to any suitable data.

The reference stations (e.g., base stations) preferably function to receive satellite observations which can be used to correct satellite observations made at the GNSS receiver (e.g., mobile receiver). The reference station satellite observations can be used to difference (e.g., form combinations with) the GNSS receiver observations, to model corrections (e.g., used by a corrections generator to generate a model of the GNSS corrections), and/or can otherwise be used. The reference stations are preferably at substantially the same height relative to sea level (e.g., within about 100 m of the same height above sea level), but can have any suitable height(s) relative to each other and/or relative to the sea level.

The computing system preferably functions to process the data (e.g., satellite observations, reference station observations, sensor data, etc.) received by the GNSS receiver(s) and/or the reference station(s). The computing system can: determine GNSS corrections (e.g., based on reference station satellite observations), generate a GNSS corrections message, sign a GNSS corrections message, verify GNSS corrections (e.g., to determine whether they have been corrupted), filter the data (e.g., to calculate state vectors, ambiguities such as phase ambiguities, etc. associated with the data), calculate the GNSS receiver position (e.g., the GNSS phase center position), broadcast the GNSS corrections message, receive a request for GNSS corrections, transmit requested GNSS corrections, calculate an integrity of the positioning solution (e.g., the protection level, the integrity risk, the total integrity risk, etc.), calculate the external system (e.g., vehicle, rover, etc.) positioning solution (e.g., location, speed, velocity, displacement, acceleration, etc.), correct satellite observations (e.g., correct the satellite observations for clock errors, hardware bias, atmospheric effects, etc.), and/or can process the data in any suitable manner. The computing system can be local (e.g., to the external system, to the GNSS receiver, to a base station, etc.), remote (e.g., cloud computing, server, networked, etc.), and/or otherwise distributed (e.g., between a processor collocated with a GNSS receiver and a cloud computing system).

The computing system can include a corrections generator (e.g., configured to determine corrections), a message generator (e.g., configured to generate a GNSS correction message, configured to group GNSS corrections, sign message groups, etc. which can be part of the corrections generator or separate from the corrections generator), a message verifier (e.g., configured to verify GNSS corrections, groups of GNSS corrections, etc. which can be part of a proxy server, a positioning engine, a standalone module, etc.), a positioning engine (e.g., configured to determine a kinematic solution such as position, velocity, attitude, etc. for a GNSS receiver or associated external system), an integrity monitor (e.g., configured to monitor satellite observations for a potential feared event, configured to monitor corrections for a potential feared event, etc.), a proxy server (e.g., an intermediary between two or more endpoints), and/or any suitable component(s).

In some variants, the system (e.g., the computing system thereof) can operate in one (or more) of a plurality of modes of operation. For instance, a computing system (e.g., corrections generator, message generator, etc. thereof) can operate in a push mode (e.g., broadcast mode where the corrections generator can broadcast the corrections data, certificate data, certificate chain data, etc. absent a request for corrections data) and a pull mode (e.g., request mode where the corrections generator can broadcast the corrections data, certificate data, certificate chain data, etc. in response to a request for corrections data). In this example, the computing system preferably defaults to operating in the push mode (e.g., continuously broadcasts the corrections messages, certificate messages, etc. at predetermined times, frequency, as the corrections data is updated, etc.). The computing system can switch to the pull mode when a request is transmitted or received, based on a proxy server, in response to a request for mode switch, and/or in response to any suitable input. However, the computing system can operate in any suitable mode by default and/or switch modes in response to any suitable input. However, the corrections generator can additionally or alternatively operate in any suitable mode of operation (e.g., an initial connection mode such as to transmit specific messages like a certificate message, certificate chain message, etc. upon connection between a GNSS receiver and a correction generator; hybrid push-pull mode; semi-push mode; semi-pull mode; etc.).

4. Method

The method preferably functions to determine and/or disseminate GNSS corrections (e.g., determine corrections data for satellite signals received from satellites associated with one or more satellite constellations). The GNSS corrections are preferably used to determine high-accuracy (e.g., with an accuracy of 1 mm, 5 mm, 1 cm, 2 cm, 5 cm, 10 cm, 20 cm, 50 cm, 1 m, 2 m, values or ranges therebetween, etc.) and/or high-integrity (e.g., with a total integrity risk less than $10^{-4}$/hr, $10^{-5}$/hr, $10^{-6}$/hr, $10^{-7}$/hr, $10^{-8}$/hr, $10^{-9}$/hr, etc.) GNSS receiver positioning solutions (e.g., kinematic solutions; such as position, velocity, attitude, acceleration, etc.). However, the GNSS corrections can otherwise be used and/or the method can otherwise function.

The method (and/or steps thereof) can be performed in real or near-real time (e.g., with satellite observation receipt at a corrections generator, with satellite observations receipt at a GNSS receiver, with external system and/or GNSS receiver operation, with the determination of satellite corrections, etc.), delayed (e.g., the corrections can be predetermined for future GNSS positioning solution determination), and/or can be performed with any suitable timing. The method (and/or steps thereof) can be performed once, repeatedly, iteratively, in response to a trigger (e.g., receipt of satellite observations, request from an operator, etc.), and/or with any suitable frequency and/or timing.

Transmitting a certificate message S100 preferably functions to enable a GNSS receiver (and/or processing system associated therewith) to access information from a certificate message. The certificate message preferably includes information that can be used to verify a signature message (and/or verify GNSS corrections associated therewith). The certificate message (and/or information contained therein) is preferably signed (e.g., to ensure that the receiver can verify a source of the GNSS corrections) with a signature. The signature preferably includes a public key that is the subject of the verification. However, the signature can include any suitable information for the security verification. For instance, the certificate message can be signed using the Edwards-curve Digital Signature Algorithm (e.g., Ed25519 signature scheme, ED448, etc.), RSA, DSA, ECDSA, RSA with SHA, ECDSA with SHA, ElGamal signature scheme, Rabin signature algorithm, a pairing scheme (e.g., BLS), NTRUsign, and/or using any suitable scheme. However, the certificate message can be signed in any manner.

The certificate message can be sent (e.g., transmitted) once (e.g., at the start of the method, when a connection is initially established between a GNSS receiver and a corrections generator such as a cloud-based corrections service, etc.), at a predetermined period, a predetermined frequency, when a certificate message (or component thereof) is updated (e.g., when a new key is generated or used, to rotate keys, etc.), responsive to a trigger (e.g., when a correction message is suspected of corruption), and/or with any suitable timing. In some variants, the certificate message can be (e.g., only) sent in response to a request for a certificate message (e.g., where the public key or other information from the certificate message is stored, preloaded, etc. on the GNSS receiver processor).

Figure 5:
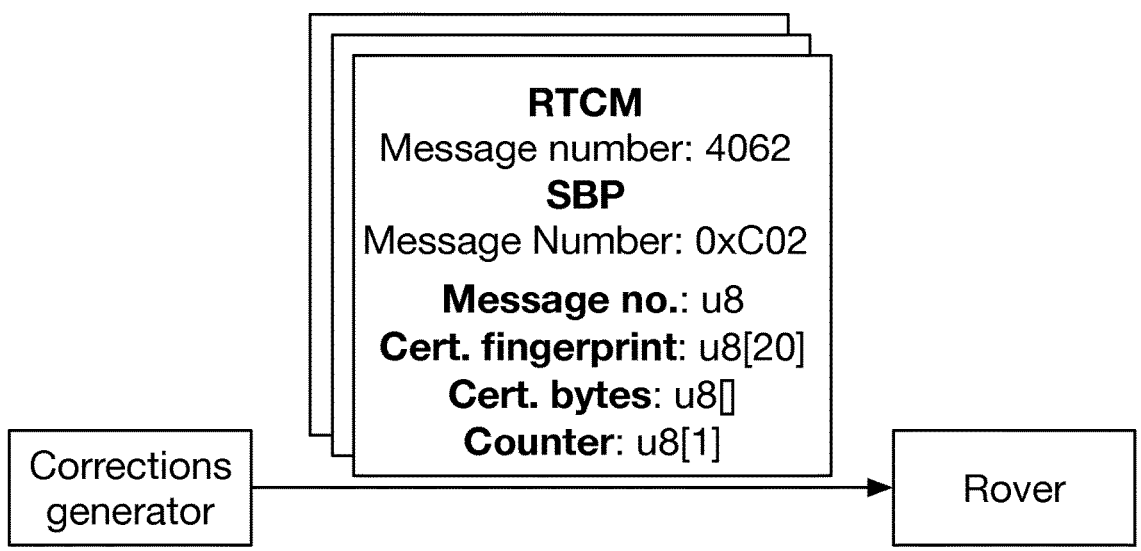
FIG. 5 is a schematic representation of an example of transmitting a certificate to a rover.

As shown for example in FIG. 5, the certificate message can include: a counter (e.g., number of messages the certificate is split across, message sequence, etc.), a certificate type (e.g., a value indicating which type of certificate is transmitted), a certificate (e.g., public key, a corrections certificate, an intermediate certificate, a root certificate, etc.), a certificate fingerprint (e.g., a certificate identifier such as a predetermined number of bytes of a hash of the certificate), and/or any suitable information. While the certificate is preferably transmitted in a single message (e.g., a single certificate message includes the full certificate), the certificate can be split over a plurality of messages (e.g., a plurality of certificate messages can be used to transmit the certificate, a message stream including a single certificate message and a plurality of data messages including the certificate, etc.). The certificate message can be a binary message, text message (e.g., cleartext, plaintext, ciphertext, etc.), and/or any suitable message type can be used. For instance, the certificate message can be a binary message that is wrapped in an RTCM message (e.g., RTCM v2, RTCM v3, etc.).

The certificate message can be transmitted over a wireless connection and/or a wired connection. The certificate message can be transmitted over a network link (e.g., using NTRIP), a cellular link, a radio data link (e.g., VHF, UHF, etc.), over a satellite link, and/or using any suitable data link.

The certificate fingerprint can allow the certificate message to be associated with corrections messages, and/or can otherwise function. The certificate fingerprint can be a hash (e.g., CRC, SHA, etc.), an encoding (e.g., generated by a neural network), a checksum, a truncation of the certificate, and/or can be any suitable encoding of the certificate (e.g., generated using any suitable algorithm, that provides a unique identifier of the certificate, etc.).

In some embodiments, transmitting a certificate message can include transmitting a certificate chain message. The certificate chain message can enable the GNSS receiver to determine a chain-of-trust with a corrections generation service. The certificate chain message can be transmitted in the same manner (e.g., same timing, with any suitable timing as for, etc.) and/or a different manner from the certificate message (e.g., as described above). For example, the certificate chain message can be transmitted upon a first connection between a GNSS receiver and a corrections generator (e.g., first instance, initial connection after a shutdown, etc.). In another example, the certificate chain message can only be transmitted in response to a request for a certificate chain message. However, a certificate chain message can be transmitted with any suitable timing (e.g., in response to a change in a whitelist, after an update to a corrections certificate, after an update to an intermediate certificate, etc.).

A certificate chain message can include: root certificate information (e.g., a root certificate fingerprint such as an SHA hash of a currently valid root certificate), intermediate certificate information (e.g., an intermediate certificate fingerprint such as an SHA hash of a currently valid intermediate certificate), corrections certificate information (e.g., a corrections certificate fingerprint such as an SHA hash of a currently valid corrections certificate), a validity time (e.g., a time after which signatures in the message should be considered invalid when compared with a time reference such as a GNSS reference time, an atomic clock reference time, radio time reference, etc.), a signature (e.g., a signature such as an ECDSA signature, EdDSA signature, etc. for authenticating a whitelist, i.e. the information in the certificate chain message), a signature length (e.g., a number of bytes to use of the signature), and/or any suitable information. In an illustrative example, the signature of the certificate chain message can be generated (e.g., created using the root certificate) over the concatenation of the information in the certificate chain message (e.g., the root certificate fingerprint, the intermediate certificate fingerprint, the corrections certificate fingerprint, the validity time, etc.). In this illustrative example, the receiver can establish a chain-of-trust because the root certificate is stored on the receiver (e.g., preloaded, accessed from a trusted source, etc.) and thus the receiver has "a priori" trust in the root certificate. However, additionally or alternatively, the chain-of-trust can be validated (e.g., certificate chain message can be transmitted via) in any suitable manner.

Each certificate has a validity time for which the certificate is valid. The validity time can depend on the type of certificate, the GNSS receiver, the GNSS receiver user, a geographic region (e.g., where the GNSS receiver is manufactured, where the GNSS receiver user is located, where the GNSS receiver is primarily used, where a specific instance of the GNSS receiver use occurs, etc.), frequency of use, severity or potential severity of an undetected compromise, and/or can depend on any suitable information. For instance, a root certificate (e.g., a self-signed certificate issued by a corrections generator operator that is operable to sign a certificate chain message, an intermediate certificate, a certificate revocation list, etc.) can be valid for a first validity time (e.g., 20 years, 30 years, 35 years, 50 years, etc.), an intermediate certificate (e.g., a certificate signed by a root certificate and used for signing new corrections certificates) can be valid for a second validity time (e.g., 6 months, 1 year, 2 years, 3 years, 5 years, 10 years, 20 years, 30 years, 35 years, etc.) that is less than the first validity time, and a corrections certificate (e.g., used to sign the corrections data) can have a third validity time (e.g., 1 month, 3 months, 6 months, 9 months, 1 year, 15 months, 18 months, 2 years, 5 years, 10 years, etc.) that is less than the second validity time. However, any certificate can have any suitable validity time.

In some variants, a plurality of certificates (particularly but not exclusively root certificates) can be provided to (e.g., stored on, transmitted to, etc.) a GNSS receiver. These variants can be beneficial for enabling a certificate to be cycled (e.g., when a certificate is no longer valid, when a certificate is compromised, etc.). In some embodiments of these variants, different certificates can be provided depending on a geographic region (e.g., geographic region for sale, operation, use, etc. of a GNSS receiver or external system to which the GNSS receiver is connected).

In some variants, certificates (e.g., corrections certificates, intermediate certificates, root certificates such as after a compromising event, etc.) can be rotated (e.g., changed). For example, certificates can be rotated at predetermined times, at predetermined frequency, in response to an action (e.g., expiration of a certificate, suspected certificate security breach, etc.), and/or with any suitable timing. For instance, a certificate (e.g., corrections certificate) can be updated when the corrections generation computing system (e.g., models thereof, states thereof, services thereof, etc.) is updated (e.g., quarterly, semiannually, annually, biannually, etc.). However, a certificate can be rotated with any suitable timing.

Determining GNSS corrections S200 functions to determine (e.g., calculate, estimate, generate, etc.) GNSS corrections that can be used by a GNSS receiver in determining a GNSS receiver positioning solution. The GNSS corrections are preferably determined by a corrections generator (e.g., operating on a cloud computing server, operating on a processor collocated with a GNSS receiver, operating on an external system processor, etc.). However, the GNSS corrections can be determined using any suitable component. The GNSS corrections are preferably determined using a set of reference station observations (e.g., a set of one or more satellite signals received by one or more reference stations). However, the GNSS corrections can additionally or alternatively be determined using prior GNSS corrections, rover observations, sensor data, and/or any suitable data or information.

The GNSS corrections can include bias corrections (e.g., phase bias corrections, code bias corrections, true bias corrections, etc.), clock corrections, orbit corrections, atmospheric delay (e.g., ionospheric delay, tropospheric delay, etc.), antenna phase center, solid earth tides, solid earth pole tides, ocean tidal loading, and/or any suitable corrections.

The GNSS corrections are preferably state space representation (SSR) corrections (e.g., where different error terms are modeled and distributed separately). However, the GNSS corrections can additionally or alternatively be observation state representation (OSR) corrections (e.g., where error terms are lumped together as an observation such as for a virtual reference station as disclosed for instance in U.S. patent application Ser. No. 18/079,640, titled 'SYSTEM AND METHOD FOR CORRECTING SATELLITE OBSERVATIONS' filed 12 Dec. 2022 which is incorporated in its entirety by this reference) and/or any suitable corrections.

The GNSS corrections can be determined using a Kalman filter, a Gaussian process, a particle filter, and/or using any suitable estimator. For example, the GNSS corrections can be determined in a manner as disclosed in Ser. No. 17/554,397 titled 'SYSTEM AND METHOD FOR GAUSSIAN PROCESS ENHANCED GNSS CORRECTIONS GENERATION' filed 17 Dec. 2021 and/or U.S. patent application Ser. No. 17/347,874 titled 'SYSTEMS AND METHODS FOR DISTRIBUTED DENSE NETWORK PROCESSING OF SATELLITE POSITIONING DATA' filed 15 Jun. 2021, each of which is incorporated in its entirety by this reference. However, the GNSS corrections can be determined in any manner.

Generating GNSS corrections message(s) (e.g., corrections data message(s)) S300 functions to determine (e.g., generate, group, create, compute, calculate, etc.) a corrections message from the GNSS corrections data (e.g., as determined in S200). The GNSS corrections message(s) are preferably generated by a corrections generator (e.g., a message generator thereof, a message signer thereof, etc.). However, the GNSS corrections message(s) can be generated by a proxy (e.g., where the proxy receives a buffer of corrections data and forms the corrections message from the buffer) and/or by any suitable component. The message generator is preferably able to generate and provide any suitable corrections message. However, additionally or alternatively, a proxy can add and/or strip information in or from the corrections data (e.g., remove or add the certificate fingerprint, corrections signature, etc. from the corrections message, add a second signature or fingerprint to verify the proxy, etc.), and/or any suitable component can facilitate a modular corrections message generation.

The signature message (e.g., associated with corrections data) can include: a corrections signature, a signature length (e.g., a number of bytes of the corrections signature to use, which can be beneficial as the corrections signature can have a maximum size but does not necessarily use the full available size), a certificate fingerprint (e.g., a certificate identifier), corrections data (e.g., a group of correction data), consistency set(s) (e.g., sets of correction data that can be used cooperatively to determine a validated positioning solution), integrity flag(s), a counter (e.g., a broadcast counter, a push counter, a stream counter, a pull counter, a request counter, an on-demand counter, etc.), corrections data fingerprint (e.g., a hash, encoding, etc. of corrections data signed by a corrections message), flag(s) (e.g., indicating a corrections group, indicating how many corrections datum are associated with a signature, indicating a corrections data fingerprint format, etc.), and/or any suitable information.

The corrections signature preferably functions to verify the corrections data and/or the data transfer link (e.g., to verify that the corrections data has not been corrupted, verify that corrections data was not dropped, verify that a data transfer link was not interrupted, etc.). The corrections signature is preferably associated with a group of corrections data (e.g., a plurality of corrections data associated with different types of corrections, a plurality of corrections data associated with different satellites, a plurality of corrections data associated with a common consistency set, etc.). However, each correction datum can be associated with a corrections signature, each correction datum can be signed (e.g., without an associated corrections signature), a subset of the corrections can be signed, and/or the corrections data can otherwise be signed.

Figure 4:
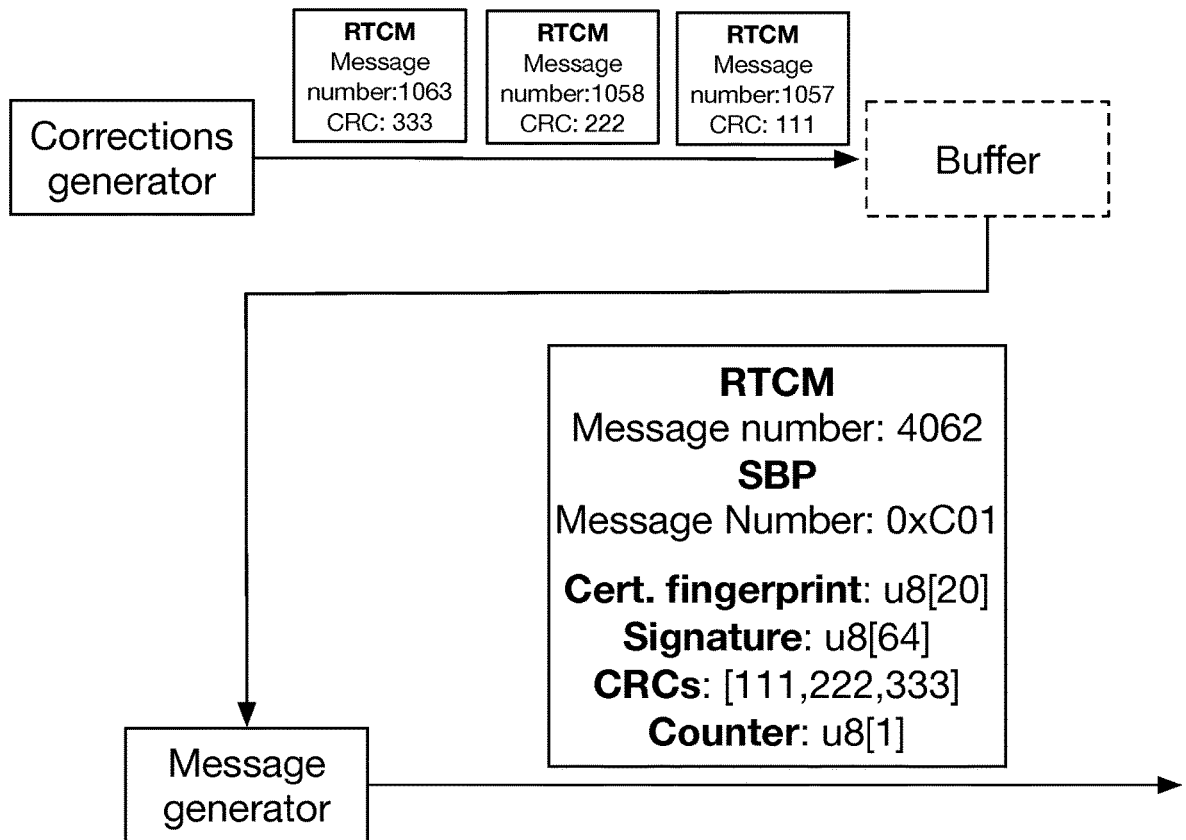
FIG. 4 is a schematic representation of an example of generating a GNSS corrections data message.

The corrections data is preferably signed over the corrections data or a representation thereof (e.g., fingerprint, hash, encoding, etc.) S350. For instance, the corrections data can be signed using ECDSA, Edwards-curve Digital Signature Algorithm (e.g., EdDSA such as Ed25519 signature scheme, ED448, etc.), RSA, DSA, ECDSA, RSA with SHA, ECDSA with SHA, ElGamal signature scheme, Rabin signature algorithm, a pairing scheme (e.g., BLS), NTRUsign and/or any suitable signing algorithm can be used. The corrections signature is preferably a representation of the corrections data (and/or other) data that allows clients to assert that the data originated from the corrections generator and was not modified. However, the corrections signature can additionally or alternatively include any suitable data and/or representation. In a specific example (as shown for instance in FIG. 4), the corrections signature can be generated by concatenating the group of corrections data (e.g., in the order that it is transmitted with the corrections message) associated with the corrections message and forming a signature from the concatenated corrections data (e.g., using a private key associated with the corrections certificate). In variations of this specific example, the corrections signature can be generated over a concatenation of the fingerprint of each correction datum associated with the corrections message. However, the signature can additionally or alternatively be or include encrypting the corrections data or fingerprint thereof (e.g., using an asymmetric encryption algorithm, using a symmetric encryption algorithm, etc.) and/or can include any suitable representation of the corrections data and/or other data. Note that some signature schemes are appropriate for some public key algorithms while not being appropriate (e.g., not being secure, not working, etc.) for other public key algorithms.

The certificate fingerprint is preferably the same as the certificate fingerprint as generated in S100 for the certificate associated with the corrections message (e.g., the corrections certificate). However, any suitable certificate fingerprint can be used (e.g., the certificate fingerprint can be unique for a corrections message such as being generated in part or in whole based on the group of corrections data, a subset of the certificate fingerprint such as a predetermined number of bytes of the certificate fingerprint, etc.).

The corrections message typically has at most a threshold size. For instance, the corrections message can be less than about 255 bytes, of which about 64 bytes are associated with the corrections signature, about 20 bytes are associated with the certificate fingerprint, and the remaining bytes are associated with the corrections data. However, the corrections message can have an unlimited size, a variable size, and/or can have any suitable size. The corrections message size is generally not correlated with a consistency set (e.g., a consistency set as disclosed in U.S. patent application Ser. No. 17/379,271 titled 'SYSTEM AND METHOD FOR PROVIDING GNSS CORRECTIONS filed 19 Jul. 2021 incorporated in its entirety by this reference, a set of distinct GNSS corrections that can be used together to determine a valid positioning solution, etc.). For instance, a consistency set can be filled (and/or a subset of elements thereof can be replaced) with more than one corrections message. However, a corrections message can be the same size as (e.g., include all elements of) a consistency set, and/or can otherwise be correlated with a consistency set.

The corrections data to be included in the corrections message can be referred to as a group of corrections. The corrections can be grouped based on time of corrections generation, consistency set of corrections, corrections validity time, corrections expiration time, corrections type, satellite associated with the corrections, satellite constellation associated with the corrections, corrections frequency, and/or any suitable grouping can be used (e.g., random or pseudo-random grouping). In a specific example, messages that pertain to a common satellite or satellite constellation (e.g., depending on the type of corrections that are transmitted) can be grouped. In a second specific example, corrections data pertaining to a common correction type can be grouped.

Figure 8:
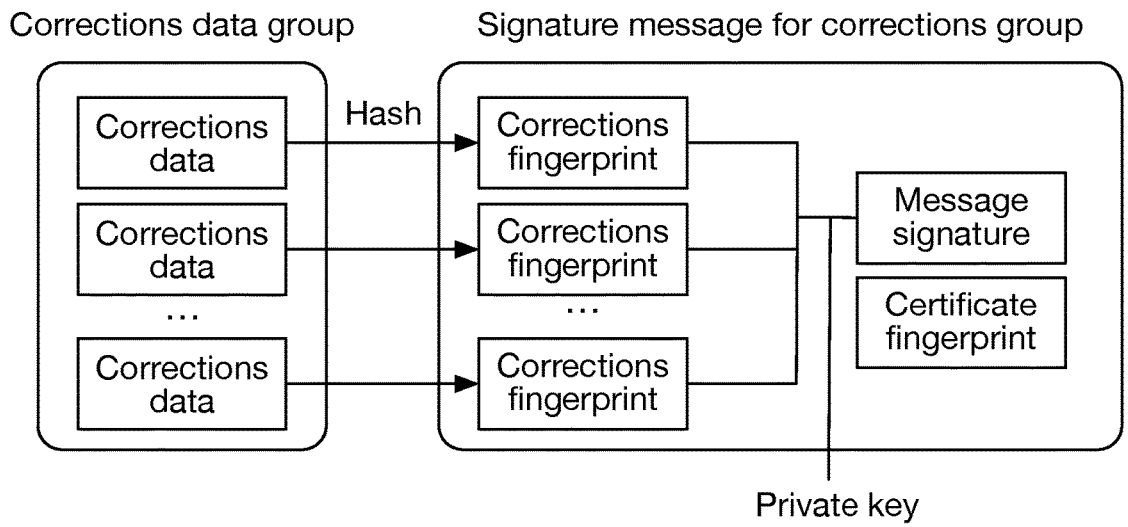
FIG. 8 is a schematic representation of an example of a relationship between a signature message and a group of corrections data.
Figure 9:
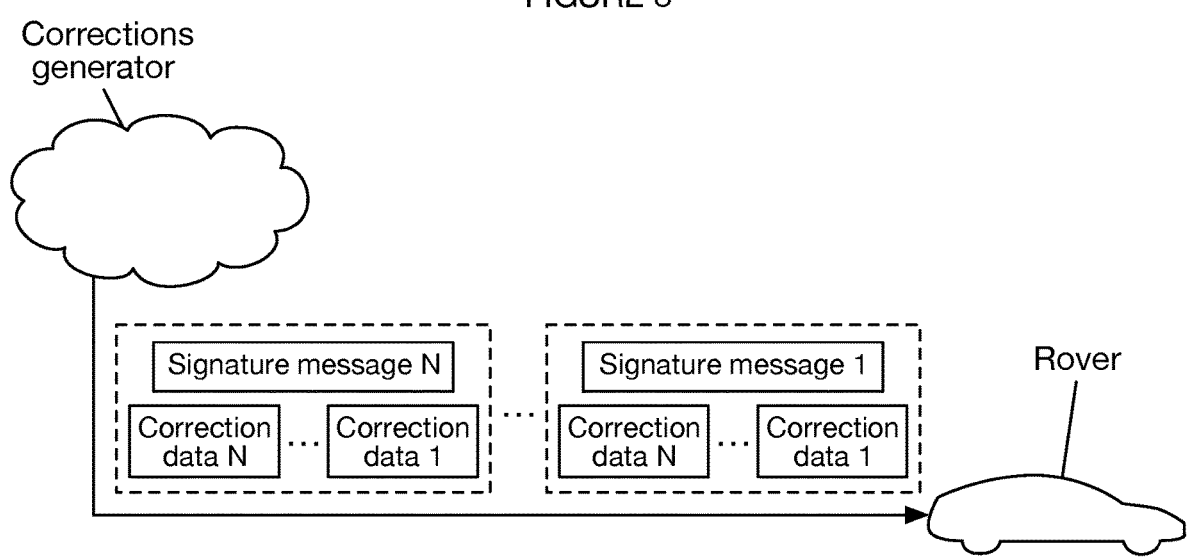
FIG. 9 is a schematic representation of an example of a corrections data stream where each corrections group is associated with a signature message.
Figure 10:
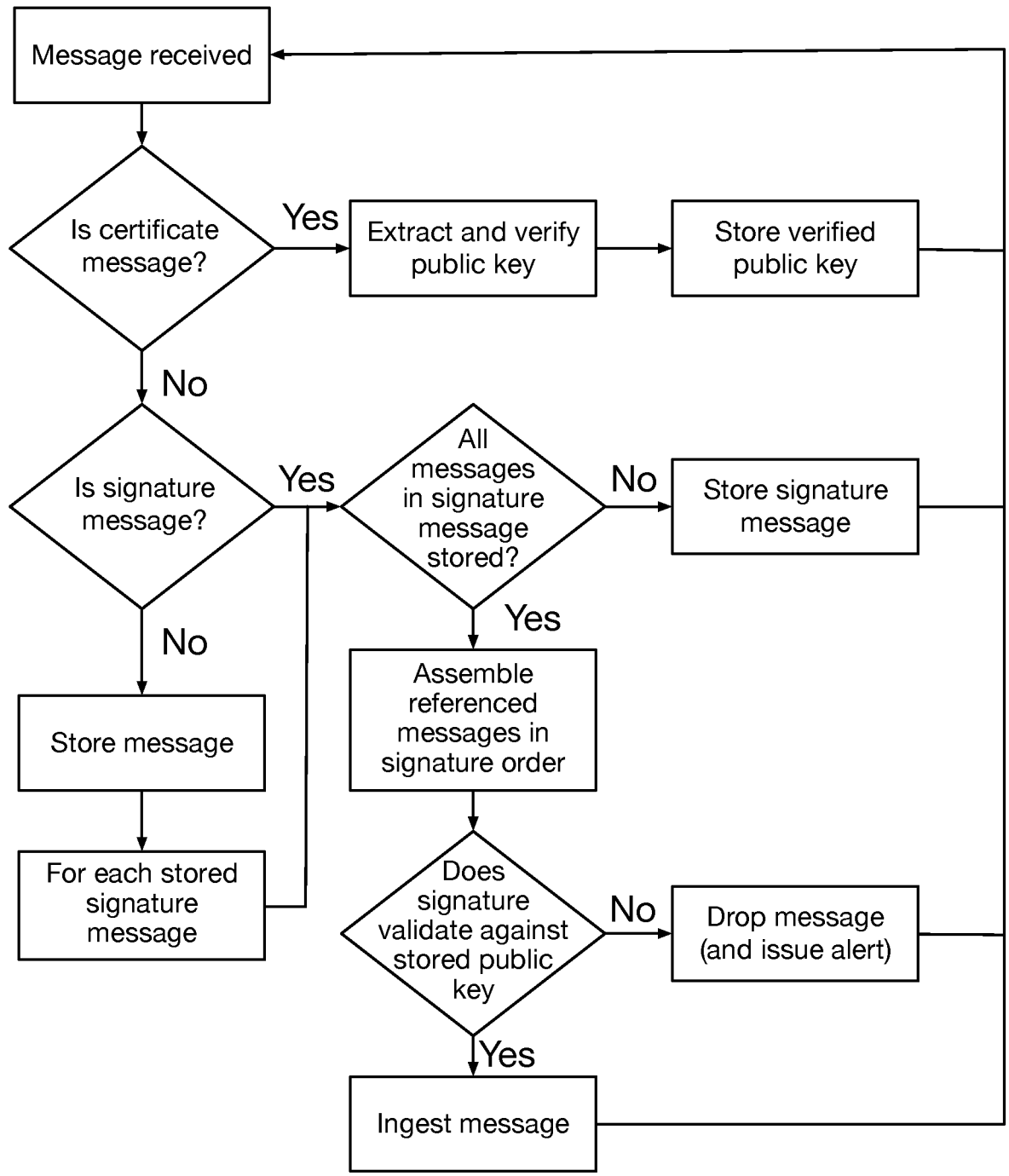
FIG. 10 is a flowchart representation of an example of a corrections message verification process.

The corrections data can be provided as raw data (e.g., cleartext or plaintext in units appropriate for the correction such as distance, time, frequency, etc.), as a hash of the corrections data, as ciphertext (e.g., using a key associated with the certificate), and/or in any suitable format. For example, the corrections data fingerprint can be or include a cyclic redundancy check (CRC) value for each corrections datum (e.g., computed using CRC-1, CRC-3, CRC-4, CRC-5, CRC-6CRC-7, CRC-7-MVB, CRC-8, CRC-10, CRC-11, CRC-12, CRC-13, CRC-14, CRC-15, CRC-16, CRC-17, CRC-21, CRC-24, CRC-30, CRC-32, CRC-40, CRC-64, etc. as shown for instance in FIG. 8), a CRC for a concatenation of or combination of (e.g., sum, difference, etc.) each corrections datum (e.g., in a predetermined order), a checksum of each corrections data (e.g., computed using Fletcher-16, Adler-32, MD5, SHA-o, SHA-1, SHA-2, SHA-3, SHA-256, SHA-512, Murmur, etc.), a checksum of a concatenation of or combination of each corrections datum, and/or can be or include any suitable fingerprint (e.g., hash, encoding, etc.) of the corrections data.

The counter can be used to verify (e.g., can be checked to determine whether) an entire set of corrections data (e.g., set of corrections packages, corrections messages, etc.) has been received (e.g., whether any of the messages in a group of corrections messages have been missed). For instance, a counter jumping by greater than 1 (excluding when a counter rolls around) between successive corrections message groups can be indicative of a missed corrections message. The counter can be a single byte counter and/or a multibyte counter. In some variants, a counter can be associated with corrections data (e.g., each corrections data within a corrections message can have a counter), with a validity set of corrections (e.g., the counter can increment for subsequent validity sets), and/or can be associated with any suitable data.

In some variations, a plurality of counters can be used. For instance, each counter can track different data and/or groups of corrections data, can track different operation modes (e.g., of a corrections generation computing system), and/or can track any suitable information. As an illustrative example, a stream counter (e.g., broadcast counter, push counter, etc.) can track (e.g., only increment for, change in response to, etc.) corrections messages (e.g., signature messages, corrections data, etc.) that are transmitted by the corrections generation computing system in the absence of a request (e.g., are freely broadcast). In this illustrative example, an on-demand counter (e.g., request counter, pull counter, etc.) can track (e.g., only increment for, change in response to, etc.) corrections messages that are transmitted by the corrections generation computing system in response to a request for corrections data (and/or certificate information). However, the stream counter can additionally or alternatively track messages received at an endpoint (e.g., GNSS receiver) and/or any suitable information. Similarly, the on-demand counter can additionally or alternatively track requests (e.g., how many requests have been sent), messages that are received within a threshold time of sending a request, and/or any suitable information. In some variations, a certificate counter can be used (e.g., to track certificate messages, to track requested certificate messages, etc.). However, any suitable counters can be used (e.g., a single counter can be used to track all received messages).

In some variations, the content of the corrections message can vary (e.g., based on an application or use case for the positioning solution). For instance, for uses of the GNSS receiver positioning solutions that are referred to as "safety-critical" or "safety-desired" (e.g., seek a tight tolerance for high integrity positioning solution), the corrections message can include the group of corrections data, the certificate fingerprint, and the corrections signature (which can provide a technical advantage of facilitating verification of the corrections data). In other examples, such as when the GNSS receiver positioning solutions are used in non-"safety critical" or low safety acceptable situations, the corrections message can include only the group of corrections data (which can benefit from a decrease in data bandwidth, not transmitting unused data, etc.).

Generating the corrections message can include transmitting the corrections message (e.g., from a corrections generator to a proxy, from a corrections generator to a GNSS receiver, from a corrections generator to a rover, etc.).

The corrections message is preferably transmitted from the corrections generator (e.g., corrections generation computing system, operating on a cloud computing server, operating at a computing system remote from the GNSS receiver, etc.) to the GNSS receiver (e.g., a processor thereof, a message verifier therewith, a positioning engine therewith, etc.). In some variations, the corrections message can be transmitted through a proxy (e.g., gateway) such as a proxy operated by a GNSS receiver operator (as shown for example in FIG. 6, FIG. 7A, or FIG. 7B). However, the corrections message can otherwise be transmitted. The corrections message are preferably generated by a message generator and/or message signer (e.g., collocated with the corrections generator, operating on a shared processor, operating on a common server, etc.), but can be generated by any suitable component. The message generator and message signer are preferably colocated in the same software component, which can be beneficial for minimizing the time points where compromised and/or corrupted information can be introduced. However, the message generator and message signer can be distributed on different software components.

Corrections messages can be transmitted as a corrections message buffer is filled, as new corrections data is determined, as new satellites come in-view of the GNSS receiver, as satellites exit view of the GNSS receiver, at predetermined times, at a predetermined frequency, when a corrections data consistency set (e.g., as disclosed in U.S. patent application Ser. No. 18/117,879 titled 'SYSTEM AND METHOD FOR PROVIDING GNSS CORRECTIONS' filed 6 Mar. 2023 which is incorporated in its entirety by this reference) is no longer valid, when a corrections data consistency set changes, when the corrections data changes (e.g., for a given correction), in response to a request for corrections data, and/or with any suitable timing.

The corrections message can be transmitted over a wireless connection and/or a wired connection. The corrections message can be transmitted via satellite communication, optical communication (e.g., infrared, microwave, etc.), broadcast radio, Wi-Fi cellular communication, Bluetooth, and/or using any suitable wired or wireless communication. The corrections messages are preferably distributed using NTRIP, but any suitable distribution protocol can be used. The corrections messages are preferably configured to be independent of (and resilient to message reordering and/or loss resulting from), and therefore not depend on, an underlying transport layer protocol (e.g., to enable any transport layer protocol such as UDP, TCP, TLS, etc.). However, the corrections message may depend on the underlying transport layer protocol.

Figure 6:
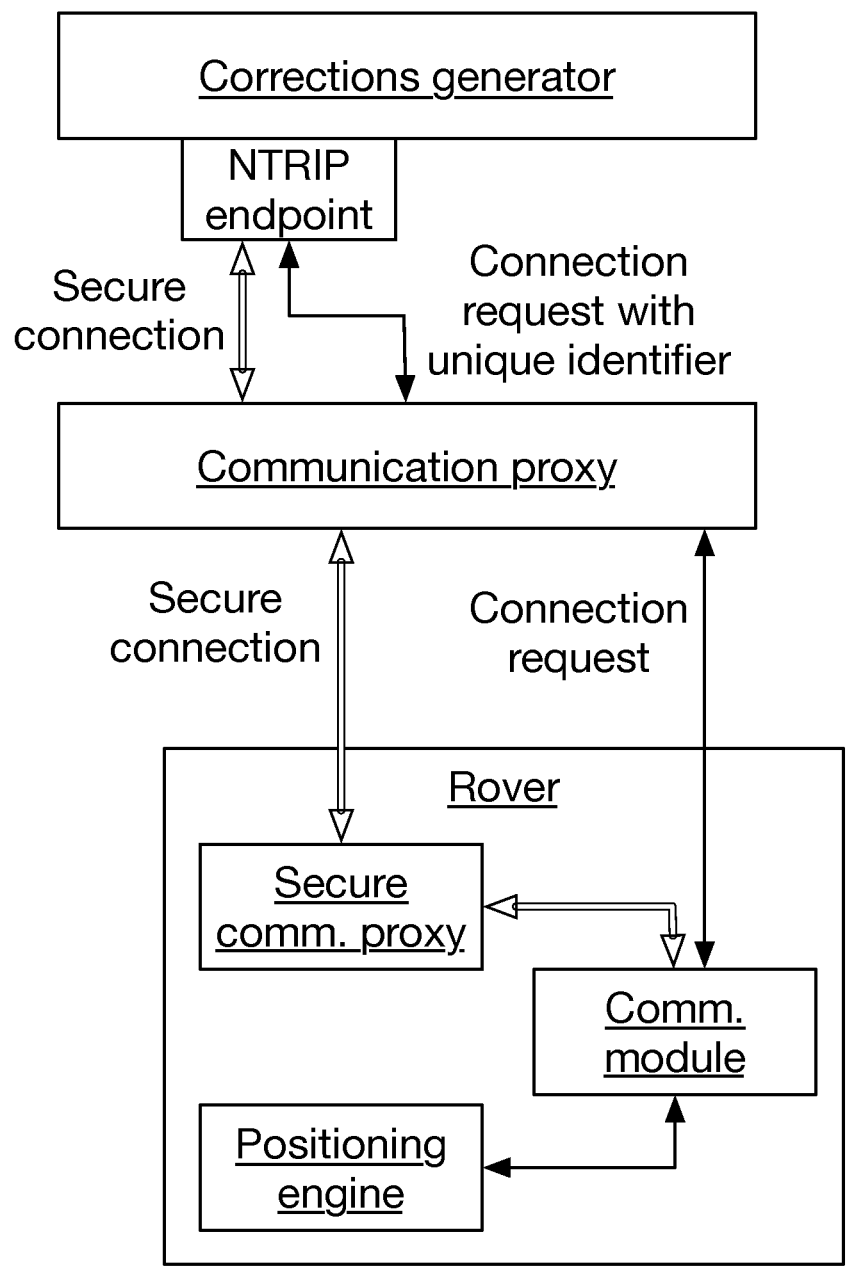
FIG. 6 is a schematic representation of an example of data flow between a rover and a corrections generator.
Figure 7A:
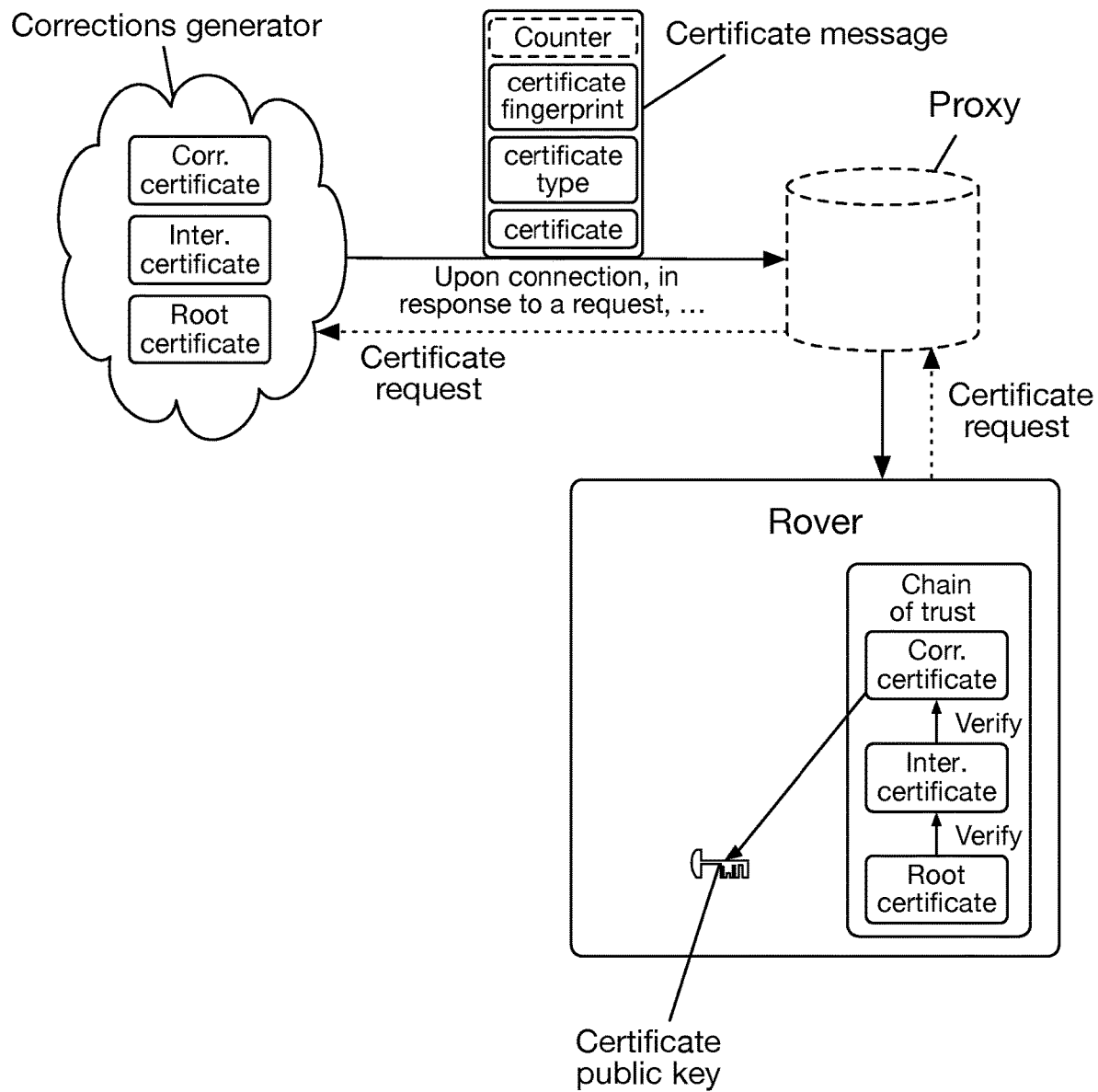
FIG. 7A is a schematic representation of an example of transmitting a certificate message (or relatedly a certificate chain message) between a corrections generator (e.g., corrections generation computing system, corrections processor, etc.) and a GNSS receiver (e.g., via a proxy, client intermediate, etc.).
Figure 7B:
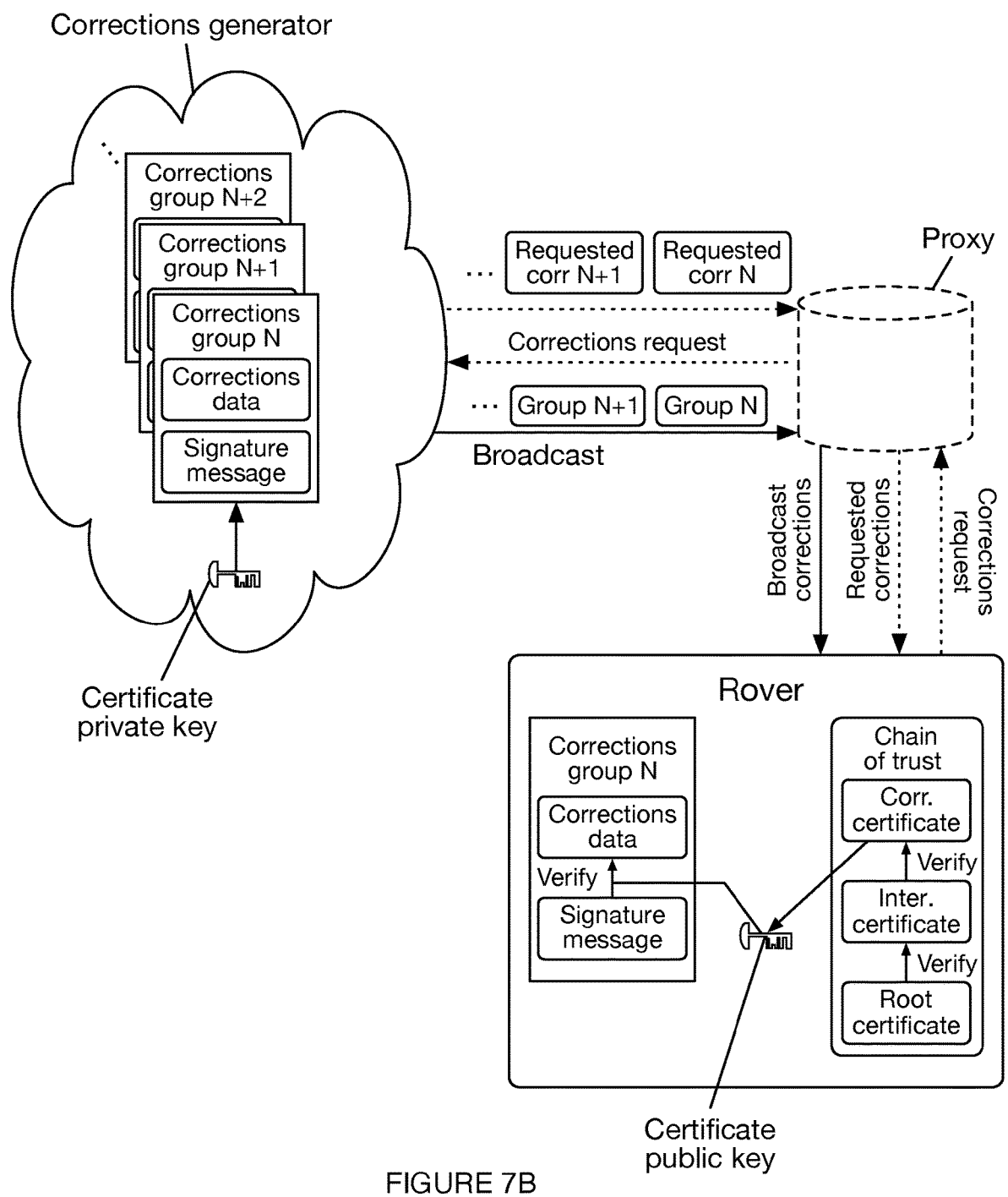
FIG. 7B is a schematic representation of an example of transmitting corrections messages between a corrections generator (e.g., corrections generation computing system, corrections processor, etc.) and a GNSS receiver (e.g., via a proxy, client intermediate, etc.).

In some variants, transmitting the corrections message can include verifying that the corrections message requester (e.g., corrections message receiver) are authentic. For example (as shown in FIG. 6), a corrections message requester (e.g., rover) can transmit a unique identifier (e.g., in an NTRIP header) with the request for corrections to the corrections generator. Exemplary unique identifiers include device serial number, VIN, or other unique ID (e.g., unique to a device, unique to a device operator, etc.). The unique identifier can be compared to a list of authenticated unique identifiers to determine whether the request is from an authorized user. However, the corrections message requester can otherwise be authenticated.

In some variants, the corrections message requester can transmit a locality (e.g., rover location, approximate GNSS receiver location, GNSS receiver tile, etc.). The corrections generator can transmit corrections data associated with the locality (e.g., a corrections tile associated with the locality) to the corrections message requester (e.g., as disclosed in U.S. patent application Ser. No. 17/833,560 titled "SYSTEM AND METHOD FOR DETERMINING GNSS POSITIONING CORRECTIONS" filed 6 Jun. 2022 or US Patent Application Number titled 'SYSTEM AND METHOD FOR PROVIDING GNSS CORRECTIONS filed 19 Jul. 2021 each of which is incorporated in its entirety by this reference). However, additionally or alternatively, adjacent tiles can be transmitted, all corrections can be transmitted, all corrections associated with a geographic region (e.g., city, county, country, state, parish, continent, etc.) can be transmitted, and/or any suitable tiles and/or corrections can be transmitted.

Verifying the corrections data S400 functions to verify that the corrections message (e.g., corrections data therein)

were received from a valid source (e.g., the corrections generator) and/or without corruption (e.g., due to malicious attacks, due to random events such as noise, due to interruption in a datalink, etc.). The corrections message is preferably verified in a processor collocated with the GNSS receiver (e.g., a corrections verifier, message verifier, etc. thereof). However, the corrections message can be verified in a processor remote from the GNSS receiver (e.g., in a processor, server, proxy, etc. associated with an operator of the GNSS receiver where the verified corrections message and/or corrections data can be transmitted over a data link associated with the operator). In some variants, the corrections message may not be verified (e.g., when the corrections message does not include a certificate fingerprint, corrections signature, etc.).

The corrections data (and/or corrections message) can be verified using a signature verification algorithm. For example, a message verifier can process the corrections signature and the public key (e.g., certificate such as received in S100) to generate a verification value over which a verification function will be applied (e.g., CRC, checksum, etc.). In this example the message verifier can apply the same hash function (e.g., CRC, checksum, etc.) on the corrections data (e.g., in the same order as the corrections data was processed to generate the signature) to generate a hash value. The verification function can be computed over the hash value. When the verification function indicates success, then the corrections message (and/or corrections data therein) can be valid. When the verification function does not indicate success, then the corrections message (and/or corrections data therein) can be invalid. However, the corrections data (and/or corrections message) can otherwise be verified.

The message verifier preferably uses the certificate fingerprint (e.g., from the corrections message) to ensure that the correct certificate is used for the corrections data and/or corrections message verification. However, the correct certificate can otherwise be determined (e.g., use a most recent certificate).

In some variations, a collision (e.g., a false positive verification) could occur (i.e., the corrections data and/or corrections message may be verified despite being corrupted). To mitigate a risk of these variations, a second verification process can be performed (e.g., using a second certificate, using a prior certificate, using a second corrections signature such as generated using the group of corrections data in a different order, etc.). However, (particularly but not exclusively when the risk of a collision is less than a threshold value), no risk mitigation processes can be performed and/or a collision or probability of a collision having occurred can be detected in any manner (e.g., a collision risk can be allocated an integrity risk as part of a total integrity budget).

When messages are missing (e.g., a connection latency is too long and information has expired, a validity time has elapsed, one or more messages from a group of messages is not received, etc.), the message verifier can detect an error. Missing a set of messages preferably does not represent a safety risk or safety violation. However, missing a set of messages can present a safety risk. Missing a set of messages typically impacts availability. However, in some variants, missing a set of messages can not impact an availability (e.g., because a prior correction is still usable).

Determining the GNSS receiver positioning solution S500 preferably functions to determine (e.g., estimate, calculate, etc.) a kinematic solution (e.g., position, velocity, speed, acceleration, attitude, time, etc.) of the GNSS receiver (and/or external system). The GNSS receiver positioning solution is preferably determined using a positioning engine (e.g., a positioning engine of a computing system collocated with the GNSS receiver, a cloud positioning engine, etc.), but can be determined by any suitable component.

The GNSS receiver positioning solution is preferably determined using corrected satellite observations (e.g., the GNSS receiver satellite observations received in S100 corrected using the corrections generated in S200), but can be determined using any suitable satellite observations (e.g., uncorrected satellite observations, differenced satellite observations, etc.). The satellite observations can be precorrected (e.g., before a filter or estimator processes the satellite observations to determine the GNSS receiver positioning solution), corrected in an estimator (such as a Kalman filter, extended Kalman filter, unscented Kalman filter, particle estimator, Gaussian process, etc.; where the GNSS corrections can be an input to the estimator), and/or can otherwise be corrected.

The positioning solution is preferably determined using carrier phase (e.g., ambiguity resolved carrier phase), but can additionally or alternatively be determined using pseudorange, doppler, and/or any suitable satellite signal(s). Determining the positioning solution can include determining the carrier phase ambiguity (e.g., to a floating point precision, to integer precision, etc. such as disclosed in U.S. patent application Ser. No. 16/817,196 filed 12Mar. 2020 entitled "SYSTEMS AND METHODS FOR REAL TIME KINEMATIC SATELLITE POSITIONING" or in U.S. patent application Ser. No. 17/022,924 filed 16Sep. 2020 entitled "SYSTEMS AND METHODS FOR HIGH-INTEGRITY SATELLITE POSITIONING," each of which is incorporated in its entirety by this reference), determining a set of floating phase ambiguity hypotheses, determining a set of integer phase ambiguity hypotheses from the set of floating phase ambiguity hypotheses, performing hypothesis testing to validate the set of integer phase ambiguities hypotheses, and/or any suitable steps.

In some variations, the method can include transmitting a certificate revocation message. The certificate revocation message can function to identify keys (e.g., private keys, certificates, etc.) that have been compromised (e.g., and therefore may not be reliable for message verification). The certificate revocation message can be signed (e.g., in the same manner as a certificate message, in the same manner as the signature message, using a root certificate, etc.). The certificate revocation message can include a list of certificates that have been revoked. However, keys can be revoked and/or no longer used in any manner.

In some variations, the method can include updating (e.g., refreshing, rotating, etc.) certificates (particularly but not exclusively intermediate or corrections certificates). The certificates are preferably updated when the corrections generation computing system (e.g., corrections generator thereof) are updated (e.g., new functionalities are added, improvements to a model or estimator used by the corrections generator are made, etc.). However, the certificates can be updated at predetermined times, a predetermined frequency, according to an update schedule, in response to a certificate being or potentially (e.g., with greater than a threshold probability) being compromised, randomly or pseudo-randomly, in response to an operator request to update certificates, and/or with any suitable timing and/or in response to any suitable trigger. When the certificate(s) are updated, a new certificate message can be transmitted (e.g., without a request), operators can be informed to (and/or can spontaneously as the certificate fingerprint does not match the stored certificate) request a certificate message and/or check a server for the updated certificate, and/or the updated certificates can otherwise be provisioned to the GNSS receiver.

In some variations, the method can include requesting information S600 which can function to request certificate and/or corrections information. The request can be sent from a GNSS receiver, a proxy (e.g., an intermediary that processes or passes along a request from a GNSS receiver), a second corrections generation computing system, and/or any suitable endpoint. Examples of information that can be requested include: corrections certificate, intermediate certificate, certificate white list, certificate revocation list, certificate chain message, low-rate corrections data (e.g., coordinate reference frame messages such as international terrestrial reference frame (ITRF), GPS WGS-84, GLONASS PZ-90, Galileo GTRF and BeiDou Coordinate System (BDC), ITRF92, ITRF94, ITRF97, ITRF2000, ITRF2005, ITRF2008, etc.; temporal reference frame messages such as earth rotataion times (e.g., UT0, UT1, UT1R, UT2, etc.), atomic times (e.g., GPS, TAI, UTC, GLONASS, etc.), dynamic times (e.g., TST, TDB, etc.), etc.; antenna phase center (APC) message such as antenna phase windup, phase center offset, phase center variation, as disclosed in U.S. patent application Ser. No. 18/196,369 titled 'SYSTEM AND METHOD FOR PROVIDING GNSS CORRECTIONS' filed 11 May 2023 which is incorporated in its entirety by this reference, etc.; ocean tidal loading message; solid earth tides; solid earth pole tides; etc.), ephemeris messages (e.g., GPS ephemeris messages, Galileo ephemeris messages, GLONASS ephemeris messages, BeiDou ephemeris message, QZSS ephemeris message, NAVIC ephemeris messages, combinations thereof, etc.), satellite clock corrections (e.g., satellite clock offsets for GPS satellites, Galileo satellites, GLONASS satellites, BeiDou satellites, QZSS satellites, NAVIC satellites, combinations thereof, etc.; combined satellite and orbit offsets for GPS satellites, Galileo satellites, GLONASS satellites, BeiDou satellites, QZSS satellites, NAVIC satellites, combinations thereof, etc.; etc.), satellite orbit corrections (e.g., satellite orbit errors for GPS satellites, Galileo satellites, GLONASS satellites, BeiDou satellites, QZSS satellites, NAVIC satellites, combinations thereof, etc.; combined satellite and orbit offsets for GPS satellites, Galileo satellites, GLONASS satellites, BeiDou satellites, QZSS satellites, NAVIC satellites, combinations thereof, etc.; etc.), satellite code bias corrections (e.g., satellite code bias error for GPS satellites, Galileo satellites, GLONASS satellites, BeiDou satellites, QZSS satellites, NAVIC satellites, combinations thereof, etc.), satellite phase bias corrections (e.g., carrier phase bias errors for GPS satellites, Galileo satellites, GLONASS satellites, BeiDou satellites, QZSS satellites, NAVIC satellites, combinations thereof, etc.), atmospheric delays (e.g., associated with a locality of the GNS receiver, operator, proxy, etc.; such as ionosphere delays, ionosphere gradients, ionosphere slant delays, troposphere delays, first-order ionosphere effects, second-order ionosphere effects, total electron count, slant total electron count, vertical total electron count, etc. which can be represented using one or more tile, STEC correction, gridded correction, gridded bound, etc.), integrity message(s) (e.g., gridded corrections and/or bounds, orbit and/or clock bounds, orbit and/or clock bound degradation, code bias bound, phase bias bound, integrity flag, satellite flag, troposphere grid point flag, ionosphere grid point flag, ionosphere tile to satellite line-of-sight flag, ionosphere grid point to satellite line-of-sight flag, combinations thereof, etc.), combinations thereof, and/or any suitable information can be requested.

An illustrative example of a method for transmitting secured (e.g., unencrypted) corrections can include: determining corrections data for satellites signals associated with one or more satellite constellation; grouping the corrections data into corrections groups; for each correction group, generating a signature message that comprises: a fingerprint of the corrections data within the respective correction group; and a cryptographic signature generated from the fingerprint of the corrections data within the respective corrections group; and transmitting each corrections group and the respective signature message for the corrections group; where the fingerprint and the cryptographic signature are operable to verify the corrections group was transmitted without data corruption or loss of data. The method can include at a GNSS receiver, verifying a corrections group of the corrections groups by: decrypting the cryptographic signature using a public key; and verifying the corrections group contains expected information (e.g., all of the corrections data in the group, the corrections data has the expected value, etc.) when a comparison of the decrypted cryptographic signature matches the fingerprint of the corrections data; and when the corrections group is verified: correcting satellite observations tracked by the GNSS receiver using the verified corrections group; and determining a positioning solution of the GNSS receiver using the corrected satellite observations. In variations of this specific example, the corrections data can be grouped into one or more of: low-rate corrections (e.g., coordinate reference frames, temporal reference frames, antenna phase center, etc.), ephemeris data (e.g., ephemeris data for satellites of one or more satellite constellations), satellite clock corrections (e.g., satellite clock offsets for satellites of one or more satellite constellations), satellite orbit corrections (e.g., satellite orbit errors for satellites of one or more satellite constellations), code bias corrections (e.g., code bias errors for satellites of one or more satellite constellations), phase bias corrections (e.g., carrier phase bias errors for satellites of one or more satellite constellations), atmospheric delays associated with a locality of the GNSS receiver (e.g., atmospheric tiles definitions, slant total electron count corrections, gridded atmospheric corrections, etc.), and integrity messages (e.g., bounds on the atmospheric delays, bounds on the satellite orbit corrections, bounds on the satellite clock corrections, degradation of the bounds on the satellite orbit corrections, degradation of the bounds on the satellite clock corrections, bounds on the code bias corrections, bounds on the phase bias corrections, high level integrity flags, satellite flags, tropospheric grid point flags, ionospheric grid point flags, atmospheric tile to satellite line of sight flags, ionospheric grid point to satellite line-of-sight flags, etc.). Variations of this illustrative example can include receiving a request for a requested corrections group, where the requested corrections group is transmitted in response to the request. In variations of this specific example the signature message can include a broadcast counter and a request counter, where the broadcast counter only increments when each corrections group is broadcast without the request and where the request counter only increments for corrections groups transmitted in response to the request. In variations of this specific example, the corrections group can be verified based on the broadcast counter or the request counter (e.g., by verifying that a value of the counter matches an expected value matching a number of requests that have been made, a number of broadcasts that have been performed, etc.). In variations of this specific example, the request can be made for one or more of: a corrections certificate comprising the public key; an intermediate certificate used to sign the corrections certificate; a certificate whitelist; low rate corrections; ephemeris data; satellite clock corrections; satellite orbit corrections; code bias corrections; phase bias corrections; atmospheric delays; or integrity messages. In variations of this specific example, the signature message further can include a corrections certificate fingerprint, where the method can include verifying a chain-of-trust of the corrections group based on a comparison of the corrections certificate fingerprint with a stored certificate. Variations of this specific example can include: transmitting (e.g., upon connection between a corrections generation computing system and the GNSS receiver, in response to a request for the certificate message from the GNSS receiver, etc.) a certificate message that can include: the corrections certificate (e.g., the public key), a root certificate fingerprint, an intermediate certificate fingerprint, and the corrections certificate fingerprint. In variations of this specific example the corrections certificate can be updated when a model used by the corrections generation computing system is updated. In variations of this specific example the corrections signature can be generated using the elliptic curve digital signature algorithm using a private key associated with the public key. In variations of this specific example, a system for performing the method can include a corrections generation computing system (e.g., corrections generator, message generator, processor, server, microprocessor, GPU, CPU, TPU, etc.) that can be configured to (e.g., operable to) determine the corrections data, group the corrections data, generate the signature message, and/or transmit the corrections group and the signature message. In variations of this specific example, the correction generation computing system can be operable in a broadcast mode and a request mode. In variations of this specific example, the signature message can be generated with a signature construction consistent with a signature algorithm, where the corrections data and/or corrections group(s) can be verified or validated using a signature verification method (e.g., verification function such as to compare values of the signature message to expected value) based on the signature algorithm. The above variations of the illustrative example can each be combined with other variations of the illustrative example and are non-limiting variations of the illustrative example.

The methods of the preferred embodiment and variations thereof can be embodied and/or implemented at least in part as a machine configured to receive a computer-readable medium storing computer-readable instructions. The instructions are preferably executed by computer-executable components integrated with a system for GNSS PVT generation. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20%, 30%, etc. of a reference), or be otherwise interpreted.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A system comprising:
a corrections generation computing system configured to:
determine corrections data for satellite signals received from satellites associated with one or more satellite constellations;
group the corrections data into corrections groups;
for each correction group, generate a signature message with a signature construction consistent with a signature algorithm; and
transmit each corrections group and the respective signature message; and
a GNSS receiver comprising:
an antenna configured to receive the satellite signals; and
a processor configured to:
receive the corrections groups and associated signature messages;
verify a corrections group of the corrections groups contains expected information using a signature verification method based on the signature algorithm;
when the corrections group is verified, determine a positioning solution of the GNSS receiver based on the satellite observations and the set of corrections
wherein the corrections generation computing system is configured to operate in:
a broadcast mode, wherein the corrections generation computing system is configured to transmit each corrections group and the respective signature message for the corrections group at predetermined times; and
a request mode, wherein the corrections generation computing system is configured to transmit one or more correction groups and the respective signature message for the one or more correction groups in response to a request for the one or more correction groups from the GNSS receiver;
wherein the signature message further comprises a broadcast counter and a request counter, wherein the broadcast counter only increments for each corrections group transmitted in the broadcast mode and wherein the request counter only increments for corrections groups transmitted in the request mode.

2. The system of claim 1, wherein the corrections data are grouped into:
low-rate corrections comprising at least one of coordinate reference frames, temporal reference frames, or antenna phase center;
ephemeris data comprising ephemeris data for satellites of one or more satellite constellations;
satellite clock corrections comprising satellite clock offsets for satellites of one or more satellite constellations;
satellite orbit corrections comprising satellite orbit errors for satellites of one or more satellite constellations;

code bias corrections comprising code bias errors for satellites of one or more satellite constellations;
phase bias corrections comprising carrier phase bias errors for satellites of one or more satellite constellations;
atmospheric delays associated with a locality of the GNSS receiver comprising slant total electron count corrections and gridded atmospheric corrections; and
integrity messages comprising bounds on the atmospheric delays, bounds on the satellite orbit corrections, bounds on the satellite clock corrections, degradation of the bounds on the satellite orbit corrections, degradation of the bounds on the satellite clock corrections, bounds on the code bias corrections, bounds on the phase bias corrections, and satellite flags.

3. The system of claim 1, wherein the GNSS receiver is further configured to verify the corrections group of the corrections groups based on the broadcast counter and the request counter.

4. The system of claim 1, wherein the GNSS receiver is configured to request at least one of:
low rate corrections;
ephemeris data;
satellite clock corrections;
satellite orbit corrections;
code bias corrections;
phase bias corrections;
atmospheric delays; or
integrity messages.

5. The system of claim 1, wherein the signature message further comprises a corrections certificate fingerprint, wherein the processor is further configured to verify a chain-of-trust of the corrections group based on a comparison of the corrections certificate fingerprint with a stored certificate that is stored on the processor.

6. The system of claim 5, wherein the corrections generation computing system is further configured to transmit a certificate message comprising a public key, a root certificate fingerprint, an intermediate certificate fingerprint, and the corrections certificate fingerprint upon initial connection between the corrections generation computing system and the GNSS receiver or in response to a request for the certificate message from the GNSS receiver.

7. The system of claim 5, wherein a corrections certificate associated with the corrections certificate fingerprint is updated when a model used by the corrections generation computing system is updated.

8. The system of claim 1, wherein the corrections data within each corrections group is not encrypted.

9. A method comprising:
determining corrections data for satellite signals received from satellites associated with one or more satellite constellations;
grouping the corrections data into corrections groups;
for each correction group of the corrections groups, generating a signature message that comprises a signature construction consistent with a signature algorithm; and
broadcasting each corrections group and the respective signature message;
receiving a request for a requested corrections group, wherein the requested corrections group is transmitted in response to the request, wherein the signature message further comprises a broadcast counter and a request counter, wherein the broadcast counter only increments when each corrections group is broadcast without the request and wherein the request counter only increments for corrections groups transmitted in response to the request; and
at a GNSS receiver, verifying a corrections group of the corrections groups contains expected information using a signature verification method based on the signature algorithm; and
when the corrections group is verified:
correcting satellite observations tracked by the GNSS receiver using the verified corrections group; and
determining a positioning solution of the GNSS receiver using the corrected satellite observations.

10. The method of claim 9, wherein the corrections data are grouped into:
low rate corrections comprising at least one of coordinate reference frames, temporal reference frames, or antenna phase center;
ephemeris data comprising ephemeris data for satellites of one or more satellite constellations;
satellite clock corrections comprising satellite clock offsets for satellites of one or more satellite constellations;
satellite orbit corrections comprising satellite orbit errors for satellites of one or more satellite constellations;
code bias corrections comprising code bias errors for satellites of one or more satellite constellations;
phase bias corrections comprising carrier phase bias errors for satellites of one or more satellite constellations;
atmospheric delays associated with a locality of the GNSS receiver comprising slant total electron count corrections and gridded atmospheric corrections; and
integrity messages comprising bounds on the atmospheric delays, bounds on the satellite orbit corrections, bounds on the satellite clock corrections, degradation of the bounds on the satellite orbit corrections, degradation of the bounds on the satellite clock corrections, bounds on the code bias corrections, bounds on the phase bias corrections, and satellite flags.

11. The method of claim 9, wherein verifying the corrections group of the corrections groups further comprises verifying the corrections group based on the broadcast counter or the request counter.

12. The method of claim 9, wherein the request comprises a request for at least one of:
a corrections certificate comprising a public key;
an intermediate certificate used to sign the corrections certificate;
a certificate whitelist;
low rate corrections;
ephemeris data;
satellite clock corrections;
satellite orbit corrections;
code bias corrections;
phase bias corrections;
atmospheric delays; or
integrity messages.

13. The method of claim 9, wherein the signature message further comprises a corrections certificate fingerprint, wherein the method further comprises verifying a chain-of-trust of the corrections group based on a comparison of the corrections certificate fingerprint with a stored certificate.

14. The method of claim 13, further comprising transmitting a certificate message comprising a public key, a root certificate fingerprint, an intermediate certificate fingerprint, and the corrections certificate fingerprint upon connection between a corrections generation computing system and the GNSS receiver or in response to a request for the certificate message from the GNSS receiver.

15. The method of claim 13, wherein a corrections certificate associated with the corrections certificate fingerprint is updated when a model used by the corrections generation computing system is updated.

16. The method of claim 9, wherein the corrections signature is generated using an elliptic curve digital signature algorithm using a private key associated with a public key.

17. A method comprising:
- determining corrections data for satellite signals received from satellites associated with one or more satellite constellations;
- grouping the corrections data into corrections groups wherein the corrections data are grouped into:
  - low rate corrections comprising at least one of coordinate reference frames, temporal reference frames, or antenna phase center;
  - ephemeris data comprising ephemeris data for satellites of one or more satellite constellations;
  - satellite clock corrections comprising satellite clock offsets for satellites of one or more satellite constellations;
  - satellite orbit corrections comprising satellite orbit errors for satellites of one or more satellite constellations;
  - code bias corrections comprising code bias errors for satellites of one or more satellite constellations;
  - phase bias corrections comprising carrier phase bias errors for satellites of one or more satellite constellations;
  - atmospheric delays associated with a locality of the GNSS receiver comprising slant total electron count corrections and gridded atmospheric corrections; and
  - integrity messages comprising bounds on the atmospheric delays, bounds on the satellite orbit corrections, bounds on the satellite clock corrections, degradation of the bounds on the satellite orbit corrections, degradation of the bounds on the satellite clock corrections, bounds on the code bias corrections, bounds on the phase bias corrections, and satellite flags;
- for each correction group of the corrections groups, generating a signature message that comprises a signature construction consistent with a signature algorithm; and
- broadcasting each corrections group and the respective signature message; and
- at a GNSS receiver, verifying a corrections group of the corrections groups contains expected information using a signature verification method based on the signature algorithm; and
- when the corrections group is verified:
  - correcting satellite observations tracked by the GNSS receiver using the verified corrections group; and
  - determining a positioning solution of the GNSS receiver using the corrected satellite observations.

\* \* \* \* \*